United States Patent
Zimmerman

(10) Patent No.: US 6,329,599 B1
(45) Date of Patent: Dec. 11, 2001

(54) FLANGED CONDUIT AND INSULATION FOR ELECTRIC WIRES AND METHOD OF USE

(76) Inventor: Harry I. Zimmerman, 310 Comstock Ave., Los Angeles, CA (US) 90024

(*) Notice: Subject to any disclaimer, the term of this patent is extended or adjusted under 35 U.S.C. 154(b) by 0 days.

(21) Appl. No.: 09/471,739

(22) Filed: Dec. 23, 1999

Related U.S. Application Data

(63) Continuation-in-part of application No. 09/083,955, filed on May 22, 1998, now Pat. No. 6,055,789, which is a continuation-in-part of application No. 08/865,550, filed on May 29, 1997, now Pat. No. 5,877,451.

(51) Int. Cl.[7] ....................................................... H02G 3/28
(52) U.S. Cl. .............................. 174/68.3; 174/48; 248/56; 312/223.6
(58) Field of Search ..................... 174/68.3, 68.1, 174/48, 49, 70 C, 95, 101; 248/65, 68.1, 71, 74.1; 312/223.6; 52/220.8

(56) References Cited

U.S. PATENT DOCUMENTS

| | | |
|---|---|---|
| 988,055 | 3/1911 | Winskill . |
| 1,772,687 | 8/1930 | Reineke . |
| 1,968,596 | 7/1934 | Benander . |
| 1,984,355 | 12/1934 | Abbot . |
| 2,157,957 | 5/1939 | Heise et al. . |
| 2,637,292 | 5/1953 | George, Jr. . |
| 2,719,341 | 10/1955 | Clerk . |
| 2,750,232 | 6/1956 | Szantay . |
| 3,253,085 | 5/1966 | Stern . |
| 3,514,914 | 6/1970 | Berquist . |
| 3,638,374 | 2/1972 | Harby . |
| 4,018,260 | 4/1977 | Baslow . |
| 4,197,686 | 4/1980 | Baslow . |
| 4,214,414 | 7/1980 | Wendt . |
| 4,336,706 | 6/1982 | Garcia . |
| 4,877,147 | 10/1989 | Hyde . |
| 5,181,357 | 1/1993 | Pourtau et al. . |
| 5,184,445 | 2/1993 | Hoopengardner . |
| 5,211,506 | 5/1993 | Manion . |
| 5,293,724 | * 3/1994 | Cornwall ............................ 52/220.8 |
| 5,514,834 | 5/1996 | Zimmerman . |
| 5,877,451 | 3/1999 | Zimmerman . |
| 6,180,878 | * 1/2001 | Gretz ...................................... 174/48 |
| 6,191,363 | * 2/2001 | Samuels ............................... 174/68.3 |

FOREIGN PATENT DOCUMENTS

| | | |
|---|---|---|
| 7811481 | 11/1978 | (DE) . |
| 1087477 | 2/1955 | (FR) . |
| 1094756 | 5/1955 | (FR) . |
| 1248702 | 11/1960 | (FR) . |
| 1456496 | 10/1966 | (FR) . |
| 7809371 | 4/1979 | (NL) . |
| 98385 | 7/1961 | (NO) . |

* cited by examiner

*Primary Examiner*—Dean A. Reichard
*Assistant Examiner*—Dhiru R Patel
(74) *Attorney, Agent, or Firm*—Curtis L. Harrington

(57) ABSTRACT

An improved conduit has a cross sectional profile which generally provides an elongate support structure having at least one anchoring structure extending from the support structure to engage any groove on a base board structure to enable the conduit to be "snapped" into a place of consistent support. Generally, the conduit will be pushed down directly against the support structure to enable the support structure to either become anchored or to flex against and secure the engagement of the anchoring structure. A flange portion support structure extends from a conduit portion and has an offset with respect to at least a portion of the conduit portion and the flange portion to form an accommodation for stacking adjacent ones of the conduit.

15 Claims, 24 Drawing Sheets

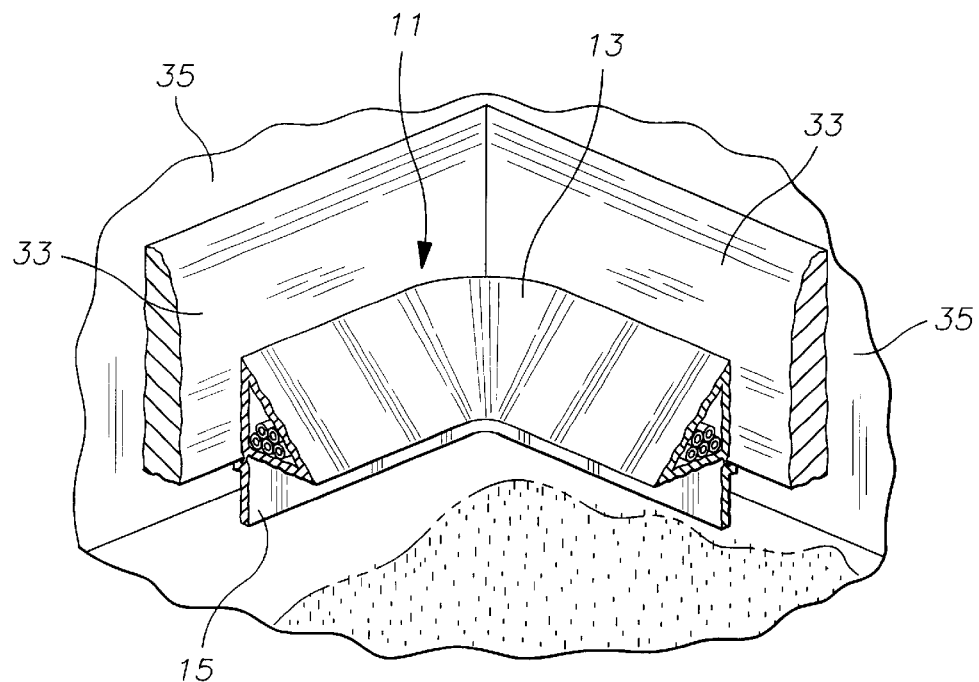
FIG. 4
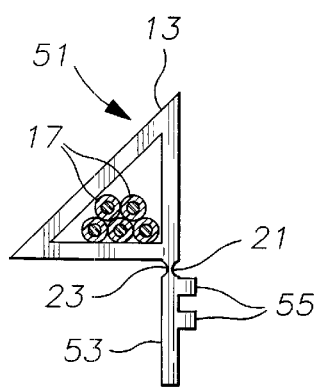 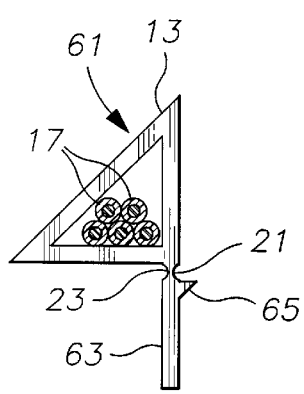 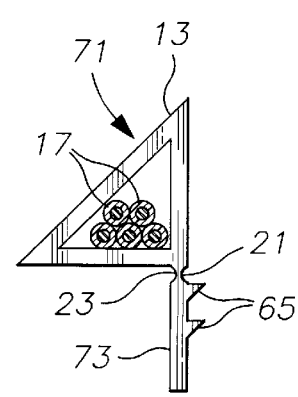
FIG. 5   FIG. 6   FIG. 7

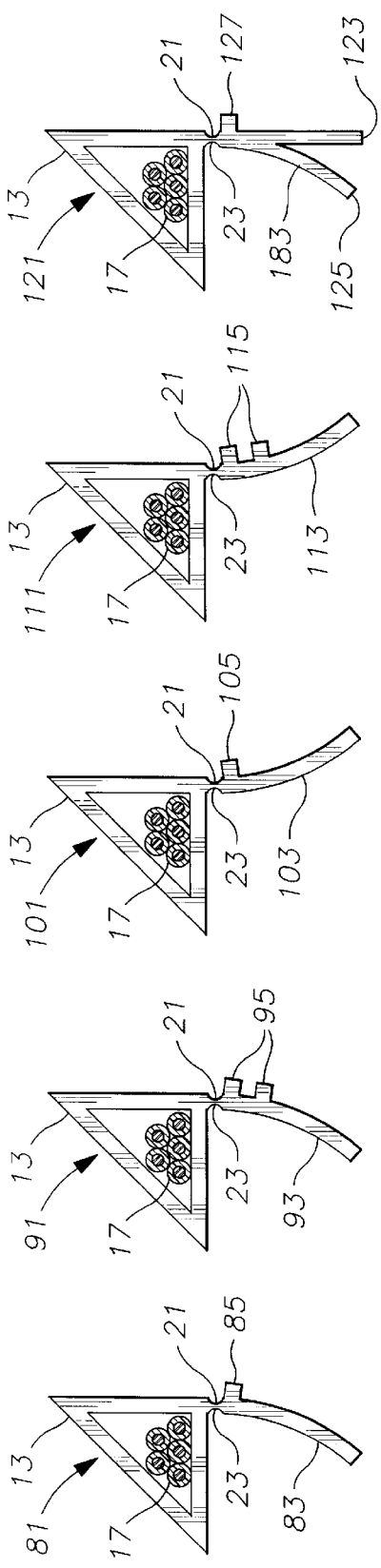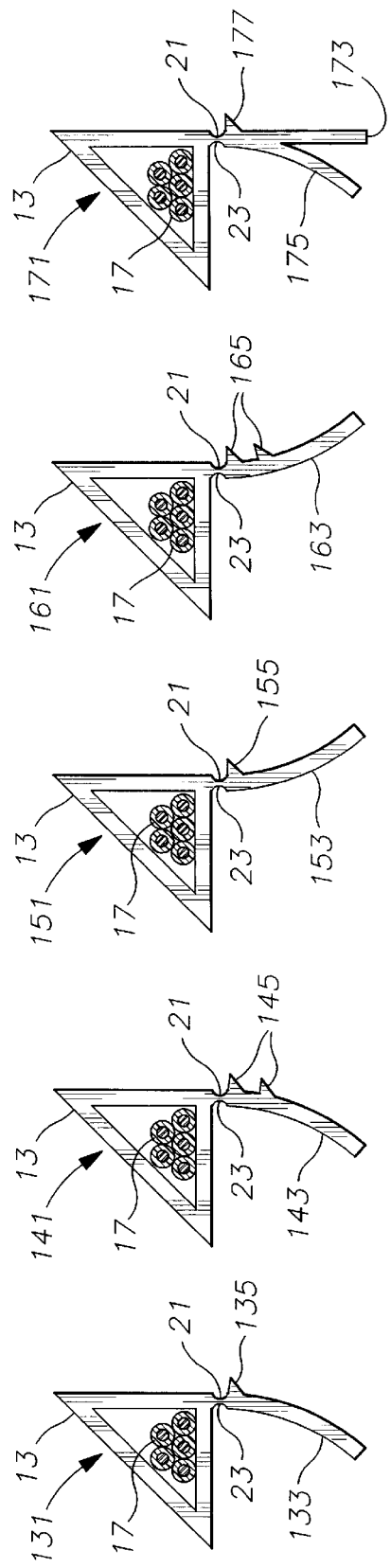

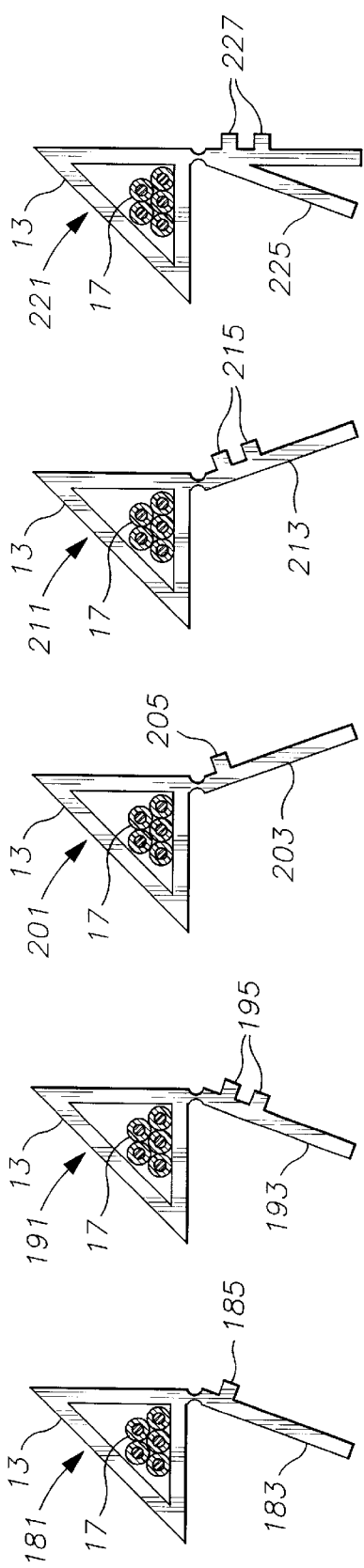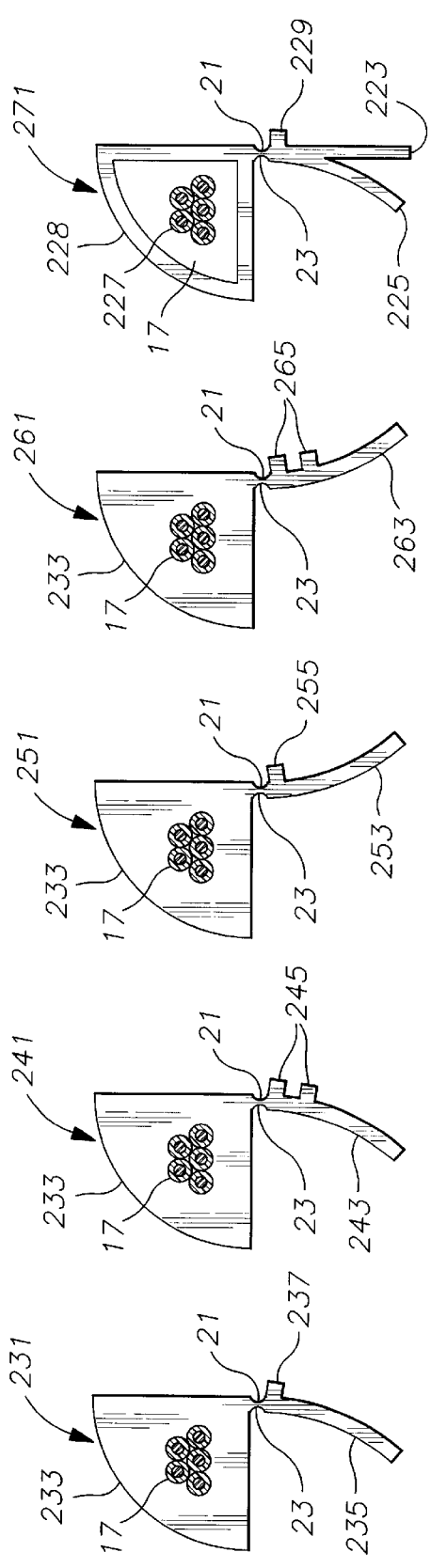

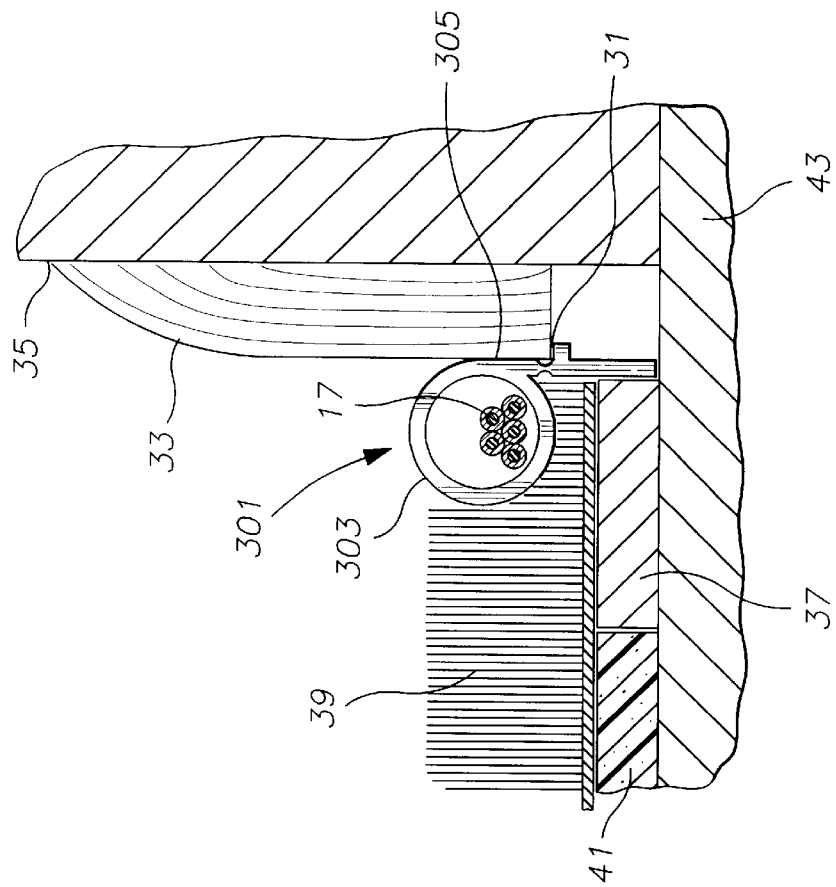
FIG. 32
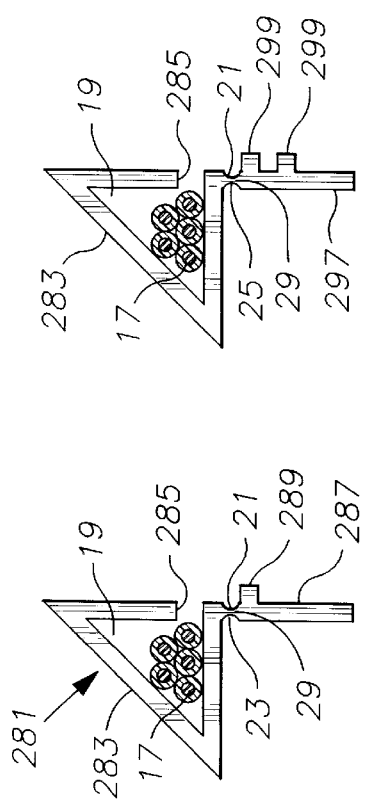
FIG. 29
FIG. 28
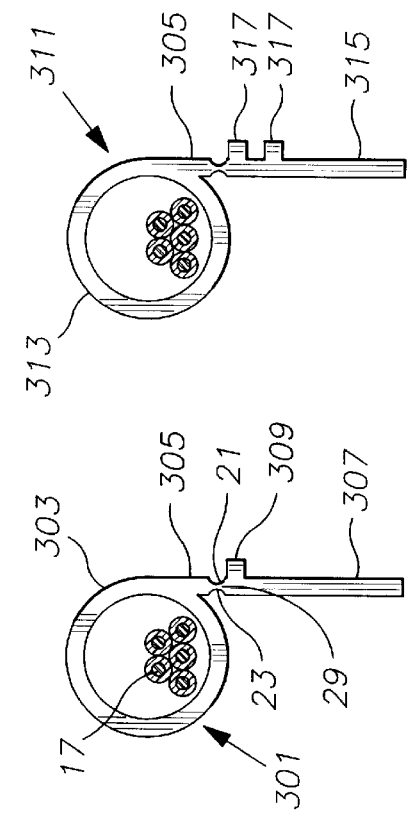
FIG. 31
FIG. 30

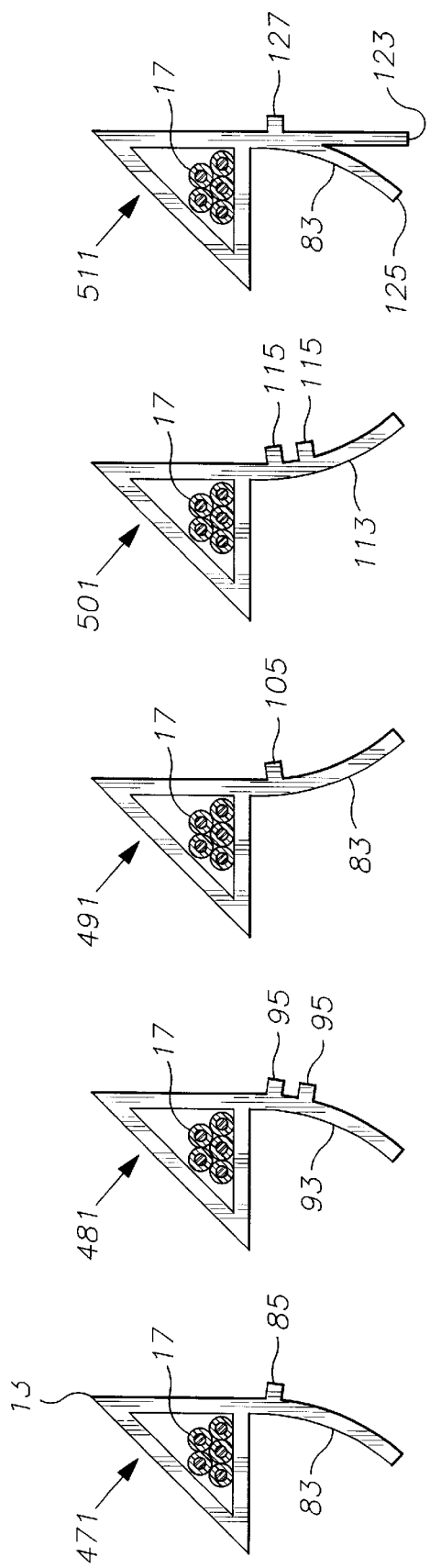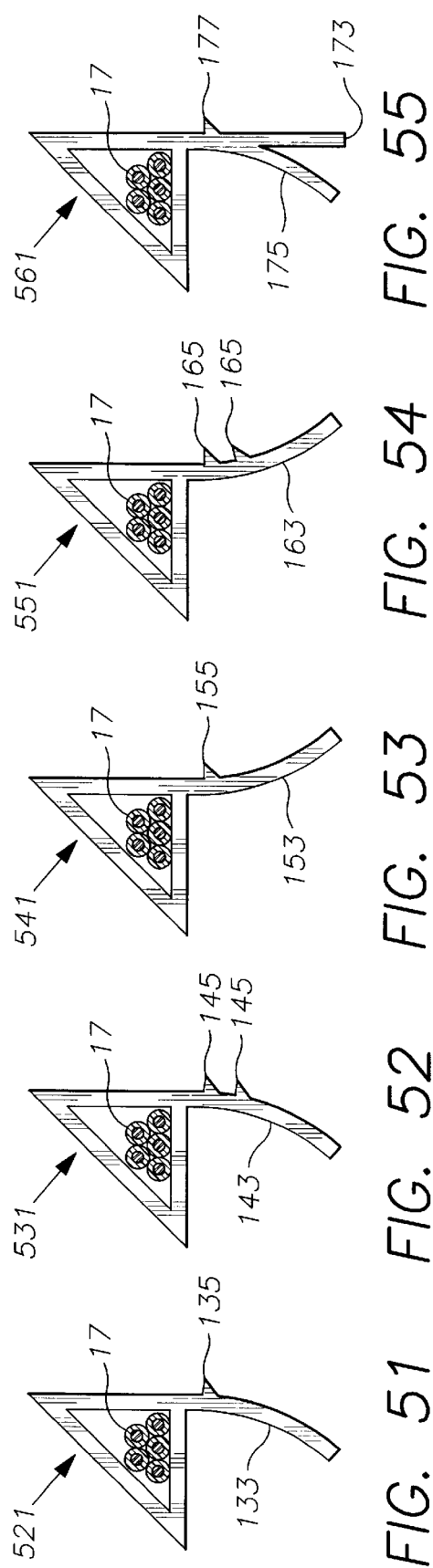

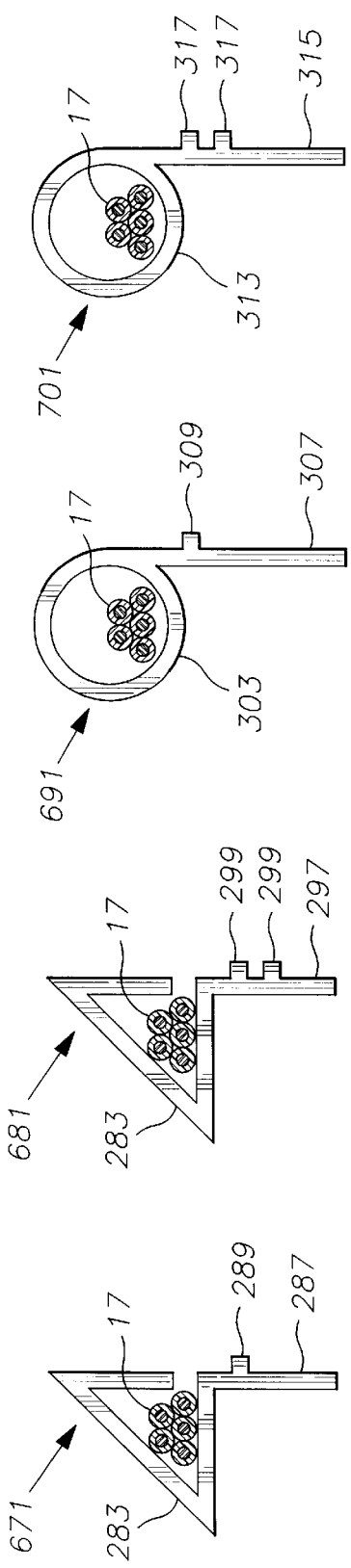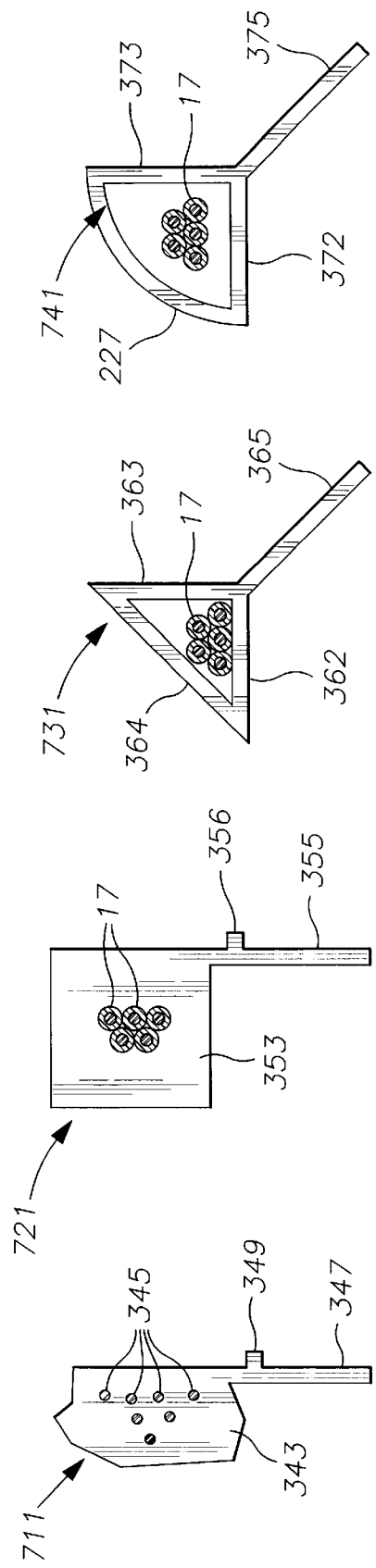

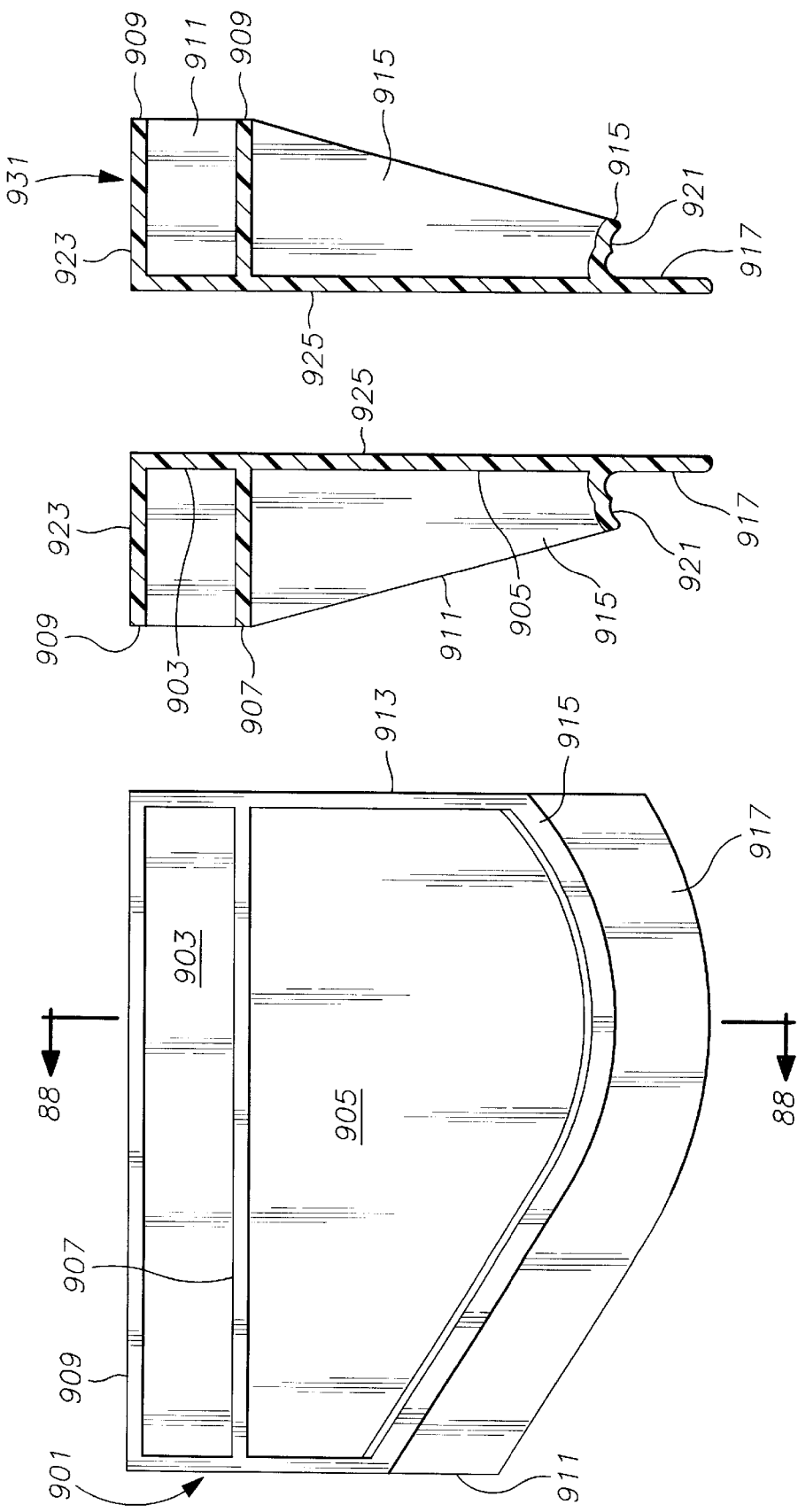

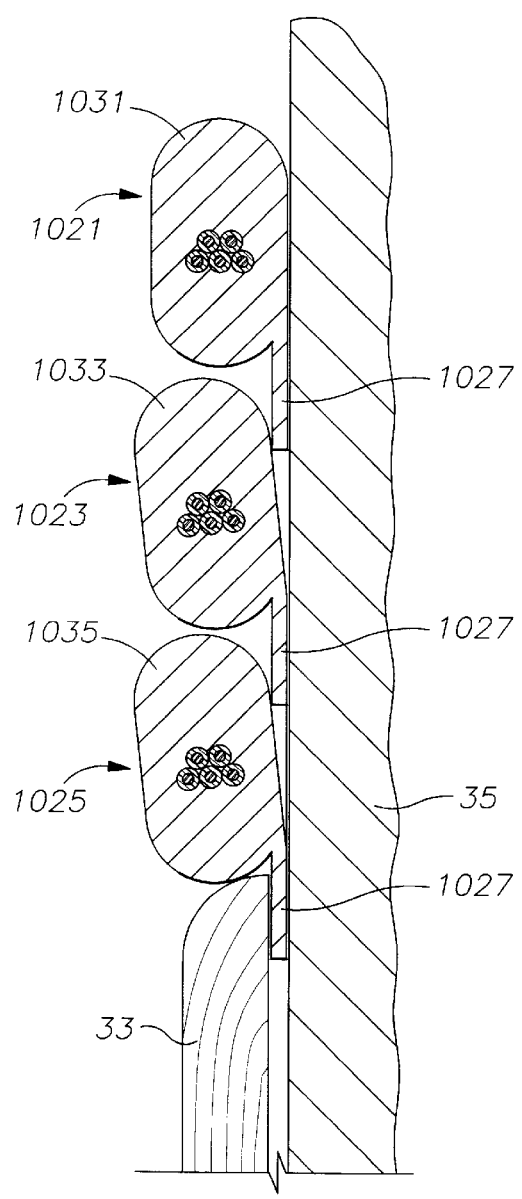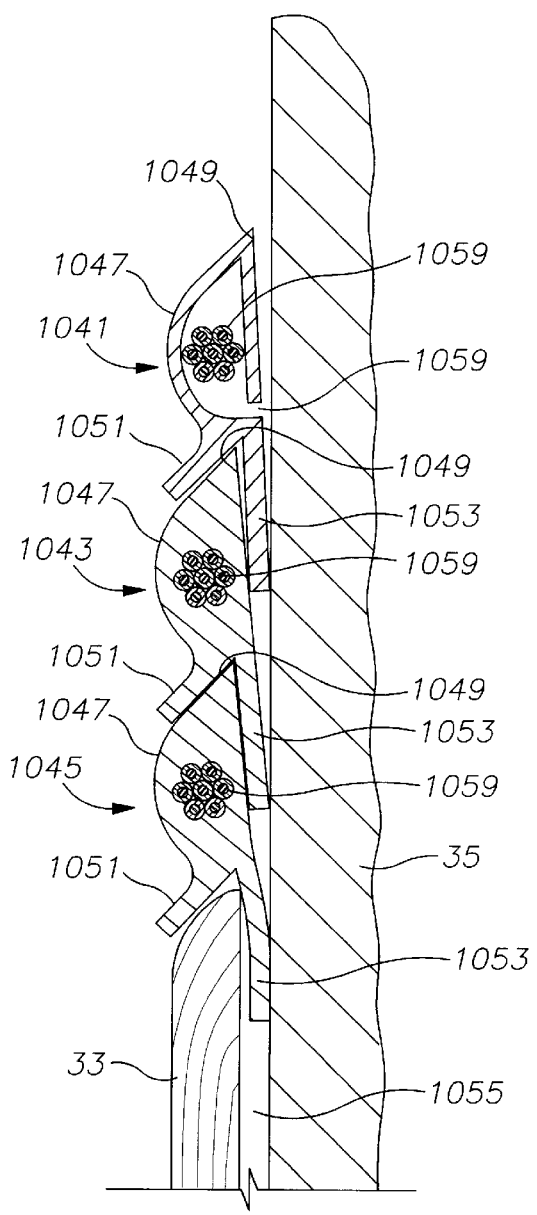

FLANGED CONDUIT AND INSULATION FOR ELECTRIC WIRES AND METHOD OF USE

This is a continuation-in-part of U.S. patent application Ser. No. 09/083,955 filed May 22, 1998, now U.S. Pat. No. 6,055,789 which is a continuation-in-part of U.S. patent application Ser. No. 08/865,550 now U.S. Pat. No. 5,877,451 and which was filed May 29, 1997.

FIELD OF THE INVENTION

The present invention relates to improvements in structures and methods for supporting and anchoring conductive wires near walls, baseboards, floors and moldings, and which facilitates installation and removal of the wires with and without the anchoring structure, and advantageous tool for use therewith.

BACKGROUND OF THE INVENTION

In U.S. Pat. No. 5,514,834 to Harry I. Zimmerman, a number of mechanical orientations of flanged conduit was disclosed which were advantageous in wiring and re-wiring applications. The structures disclosed enabled a wide variety of structures to be used which would be embraced and supported by gaps between base board and floor, and between carpeting and base boards or vertical walls.

In each of the configurations, the main theme was engagement by the use of a length of material. The length of material was frictionally engaged within a space between base board and floor or between carpet and a baseboard or vertical wall. The cross sectional profile of the engagement member represented either a linear extension to be pushed into an existing gap, or a modified linear member such as having an undulating extent or ribs in order to enable the linear member to be somewhat compressed. Compression occurred in the linear material directly through its plastic construction, in the undulating member by a straightening of the extent of the undulations while the member was under compression, or in the barbed member by bending displacement of the barbs.

In some of the orientations the amount of work necessary to obtain a secure engagement was dependent upon the type of gap which was present. In other cases, where the gap being engaged was uneven, either by uneven workmanship at the wall or base board or by an uneven floor, the conduit would be held securely in some places and not held securely in others.

A useful improvement to the conduit would be structure enabling the conduit to find an even level of engagement with the structures available. This would provide a more consistent support for the conduit despite inconsistencies in the support structures, present such as wall, baseboard, floor and carpet. The structure would not only provide a consistency in engagement and support, but would also provide consistency to the installer by providing feedback as to whether the installation motions were sufficient to result in an even installation.

In some instances, especially where the conduit and holding portion are integrally formed, the removal of the structure can damage it. Where the anchoring structure continues to be held by the wall, stripping or base board, the wire and insulation can be damaged. What is needed is a conduit in which the anchoring structure can be detached where it is held too tightly by, or has become integrated into the holding structure.

The needed structure should be held in place by using natural structures on the base board and which provide a "snap" or "click" to the installer during the installation. The degree to which the conduit is held in place should not be unduly severe and should not prevent the conduit from being easily removed. The needed conduit should promote safety, including the safety of having the wires together, as well as the safety from making certain that the conduit is held securely in place.

SUMMARY OF THE INVENTION

An improved conduit has a cross sectional profile which generally provides an elongate support structure having at least one anchoring structure extending from the support structure to engage any groove on a base board structure to enable the conduit to be "snapped" into a place of consistent support, to provide an extra measure of safety. Generally, the conduit will be pushed down directly against the support structure to enable the support structure to either become anchored or to flex against and secure the engagement of the anchoring structure. A variety of embodiments take advantage of the widest variety of corner configurations in order to provide the widest applicability of the conduit. In one embodiment, the anchoring structure has a thinned connection to the main conduit to facilitate controlled detachment of the anchoring structure in instances where the anchoring structure is bound too tightly or where the anchoring structure becomes stuck to the anchoring structure. A tool is disclosed to facilitate installation of the conduit.

BRIEF DESCRIPTION OF THE DRAWINGS

The invention, its configuration, construction, and operation will be best further described in the following detailed description, taken in conjunction with the accompanying drawings in which:

FIG. 4 is a perspective view of the conduit in a typical application extending through a tight radius to accommodate a corner;

FIG. 5 is a variation of FIG. 2 and having a pair of anchoring structures extending from a straight flange, one anchoring structure spaced above the other;

FIG. 6 is a variation of FIGS. 1 and 2 where the a single anchoring structure has a right triangular shape when viewed in cross section;

FIG. 7 is a variation on FIG. 6 and having a pair of spaced apart anchoring structures of right triangular shape;

FIG. 8 is a variation on FIGS. 1 and 2 and having a curved elongate structure curving underneath the conduit portion and having a single anchoring structure;

FIG. 9 is a variation on FIG. 8 and having a pair of anchoring structures and a curved elongate structure curving underneath the conduit portion;

FIG. 10 is a variation on FIG. 9 and having a rectangular anchoring structures and an outward curving elongate structure;

FIG. 11 is a variation on FIG. 10 and having a pair of rectangular anchoring structures and an outward curving elongate structure;

FIG. 12 illustrates a conduit portion having a dual flange portion having an inwardly curved portion and a straight portion having a single anchoring structure;

FIG. 13 illustrates a conduit portion having a curved elongate structure curving underneath the conduit portion and a single triangular shaped anchoring structure;

FIG. 14 is a variation on FIG. 9 and having a pair of triangular shaped anchoring structures and a curved elongate structure curving underneath the conduit portion;

FIG. 15 is a variation on FIG. 10 and having a triangular anchoring structure and an outward curving elongate structure;

FIG. 16 is a variation on FIG. 11 and having a pair of triangular anchoring structures and an outward curving elongate structure;

FIG. 17 illustrates a conduit portion having a dual flange portion having an inwardly curved portion and a straight portion having a single triangular anchoring structure;

FIG. 18 illustrates a straight, but angled flange portion angled underneath the conduit portion and having a single anchoring structure;

FIG. 19 illustrates a conduit having an angled elongate structure angled underneath the conduit portion and having a pair of rectangular anchoring structures;

FIG. 20 illustrates a conduit having a rectangular anchoring structures and an outward angled elongate structure;

FIG. 21 illustrates a conduit having a pair of spaced apart rectangular anchoring structures and an outward angled elongate structure;

FIG. 22 illustrates a conduit having a dual flange portion having an inwardly angled portion and a straight portion having a pair of spaced apart anchoring structures;

FIG. 23 illustrates a solid wire encasement conduit portion having a curved elongate structure curving underneath the conduit portion and a single rectangular shaped anchoring structure;

FIG. 24 illustrates a solid wire encasement conduit portion having a curved elongate structure curving underneath the conduit portion and a pair of spaced apart rectangular shaped anchoring structure;

FIG. 25 illustrates a solid wire encasement conduit portion having a curved elongate structure curving away from underneath the conduit portion and a single rectangular shaped anchoring structure;

FIG. 26 illustrates a solid wire encasement conduit portion having a curved elongate structure curving away from underneath the conduit portion and a pair of spaced apart rectangular shaped anchoring structures;

FIG. 27 illustrates a solid wire encasement conduit portion having a curved elongate structure curving underneath the conduit portion and a single rectangular shaped anchoring structure;

FIG. 28 is an open triangular conduit having a straight flange portion with a single rectangular shaped anchoring structure;

FIG. 29 is an open triangular conduit having a straight flange portion with a pair of spaced apart rectangular shaped anchoring structures;

FIG. 30 is an enclosed circular conduit having a straight flange portion extending tangentially away from the circular conduit and having a single rectangular shaped anchoring structure;

FIG. 31 is an enclosed circular conduit having a straight flange portion extending tangentially away from the circular conduit and having a pair of spaced apart rectangular shaped anchoring structures;

FIG. 32 is a sectional view of a floor, wall, and carpet and illustrating how the conduit of FIG. 30 would be implaced in a typical application having a base board and wall structure;

FIG. 46 is a variation on FIG. 8 and having a curved elongate structure curving underneath the conduit portion and having a single anchoring structure, with a straight connection between the flange portion and the conduit portion;

FIG. 47 is a variation on FIG. 9 and having a pair of anchoring structures and a curved elongate structure curving underneath the conduit portion, with a straight connection between the flange portion and the conduit portion;

FIG. 48 is a variation on FIG. 10 and having a rectangular anchoring structures and an outward curving elongate structure, with a straight connection between the flange portion and the conduit portion;

FIG. 49 is a variation on FIG. 11 and having a pair of rectangular anchoring structures and an outward curving elongate structure, with a straight connection between the flange portion and the conduit portion;

FIG. 50 illustrates a conduit portion having a dual flange portion, with a straight connection between the flange portion and the conduit portion, and having an inwardly curved portion and a straight portion;

FIG. 51 illustrates a conduit portion having a curved elongate flange structure, with a straight connection between the flange portion and the conduit portion and a single triangular shaped anchoring structure;

FIG. 52 illustrates a conduit portion having a curved elongate flange structure, with a straight connection between the flange portion and the conduit portion and a pair of triangular shaped anchoring structures;

FIG. 53 illustrates a conduit portion having a curved elongate flange structure, with a straight connection between the flange portion and the conduit portion and a single triangular shaped anchoring structure;

FIG. 54 illustrates a conduit portion having a curved elongate flange structure, with a straight connection between the flange portion and the conduit portion and a pair of triangular shaped anchoring structures;

FIG. 55 illustrates a conduit portion having a curved elongate flange structure, with a straight connection between a split flange portion having an inwardly curved portion and a straight portion having a single triangular shaped anchoring structure;

FIG. 66 illustrates an open triangular conduit having a flange with a straight connection to the conduit portion and having a rectangular anchoring structure;

FIG. 67 illustrates an open triangular conduit having a flange with a straight connection to the conduit portion and having a pair of rectangular anchoring structures;

FIG. 68 is an enclosed circular conduit having a straight flange portion with a straight connection to the conduit portion and extending tangentially away from the circular conduit and having a single rectangular shaped anchoring structure;

FIG. 69 is an enclosed circular conduit having a straight flange portion with a straight connection to the conduit portion and extending tangentially away from the circular conduit and having a pair of rectangular shaped anchoring structure;

FIG. 70 is an irregularly shaped conductor structure having a solid conduit portion carrying a series of spaced apart conductors, and having a single straight flange, with a straight connection to the conduit portion, and with a single rectangular anchoring structure;

FIG. 71 is an rectangular cross shaped conductor structure having a solid conduit portion carrying a series of spaced apart conductors, and having a single straight flange with a straight connection to the conduit portion and with a single rectangular anchoring structure;

FIG. 72 is a conduit having a triangularly shaped conduit portion and a flange with a straight connection to the conduit portion and which extends away from a corner of the triangularly shaped conduit at a 45° angle from the legs and perpendicular to the hypotenuse of the triangle and having a single straight flange, the reversibility to allow for the wire to be applied to in both the left and right handed application;

FIG. 73 is a conduit having an arc shaped conduit portion and a flange with a straight connection to the conduit portion and which extends away from a corner of the triangularly shaped conduit at a 45° angle from the legs and perpendicular to the arc shaped side of the conduit portion and having a single straight flange;

FIG. 87 is a plan view of the open side of an installation tool for installing the conduit of the invention and having a lower curved surface and which is a right handed version;

FIG. 88 is a view taken along line 88—88 of FIG. 87 and illustrating the structural support portion of the tool of FIG. 87;

FIG. 89 is a view similar to that of FIG. 88, but taken with respect to a left handed version thereof;

FIG. 97 illustrates a sectional end view of a series of three, for example, stacked flanges having a heightened conduit structure and relatively short flanges to provide more space behind for stacking, and to avoid penetrating the stack too much;

FIG. 98 illustrates a flange structure with a clip member extending outward to provide cover and stability to the next most adjacent flange structure and to form a unitary appearing stack of flanges between a base board and wall, also used to help "gang" the wire moldings together, and to engage the top of a relatively more angled or thinner molding;

DETAILED DESCRIPTION OF THE PREFERRED EMBODIMENT

Figure 1:
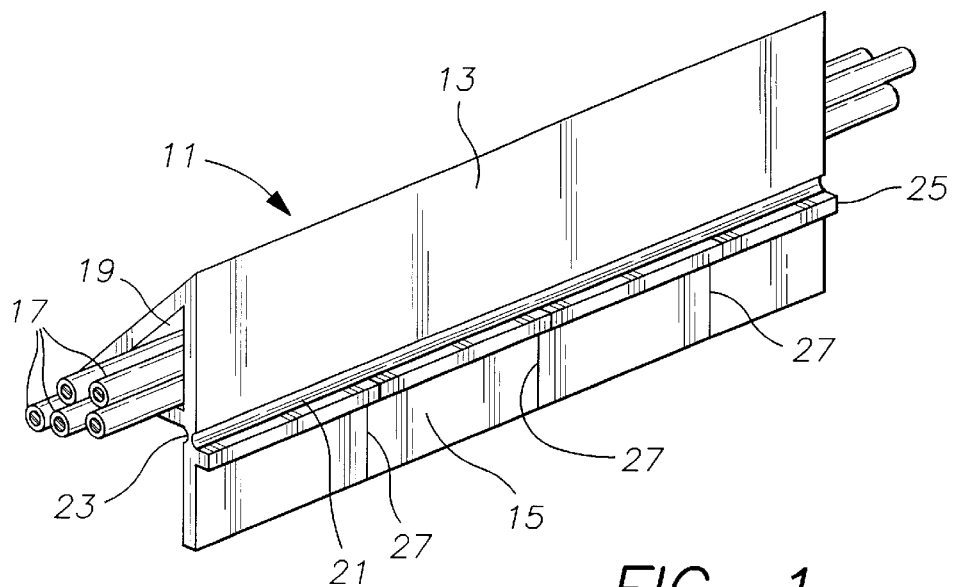
FIG. 1 is a perspective view of a first embodiment of the conduit having a triangular wire support boundary, and a locking rib positioned from the flat side of a vertical support.

Referring to FIG. 1, a perspective view of a conductor structure 11 illustrates a conduit portion 13 and a flange portion 15. Within the conduit portion 13 are a series of insulated wires 17, within a conduit space 19. This is a schematic showing, and in practice, the conduit space 19 may be eliminated and filled in with insulative material and the wires then provided within the insulation.

Immediately below the conduit portion 13, the flange portion 15 is connected through a thinned area of material shown as formed with a pair of opposing notches 21 and 23, notch 21 facing the rear side of the conductor structure 11 and notch 23 facing the front side of the conductor structure 11. The notches 21 and 23 are shown as being round notches, but any shape will suffice, the main idea being a reduced cross sectional area of material per unit length separating the flange portion 15 from the conduit portion 13.

Immediately below the notch 23, the flange portion 15 extends straight down at the front side. Immediately below the notch 21, the flange portion 15 has a rearwardly extending rib 25. The rib 25 is shown as a rectangular shape and extending from the generally vertical extent of the flange, but the rib 25 can be differently shaped and can extend at an upwardly or downwardly angle from the flange portion 15.

In addition, a series of vertically extending thinned areas or notches 27 can be seen located periodically along the length of the flange portion 15. In operation, the flange portion 15 is inserted into any available crack or thin space near the base of a wall. The flange portion 15 is flexible and easily fittable into a flange space. Flange spaces include vertical spaces between molding and wall, between carpet tacking and molding or wall, as well as others. Flange spaces also include horizontal spaces between floor and molding, tacking, walls and wall support structures. The flange portion 15 can fit equally well into either a vertical, horizontal, or angled flange space.

Figure 2:
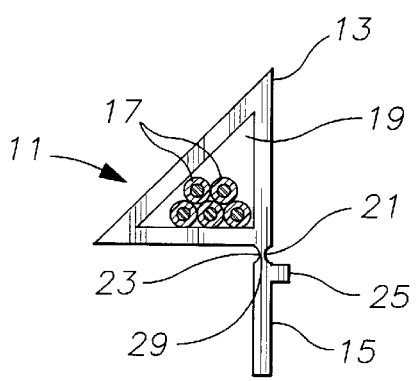
FIG. 2 is an end view of the embodiment of FIG. 1 and gives a better view of the relationship of the wire support boundary and the locking rib.

Referring to FIG. 2, an end view of the conductor structure 11 gives a better view of the structure and illustrates directly the reduced cross sectional area 29 existing at the mid point of the two notches 21 and 23. Instead of two equally opposing notches 21 and 23, a larger notch may be used on only one side of the conductor structure 11 and which comes sufficiently near to the other side that a reduced area cross section 29 is produced.

The operation of the conductor structure 11 is as follows. Where the wires or insulated wires 17 are already present within the conduit space 19, the conductor structure 11, with the flange portion 15 extending down, is inserted into a flange space. The rib 25, particularly as located below the conduit portion 13 can help the conductor structure 11 find and lock into a stabilizing structure. For example, where the conduit space is horizontal, the flange portion 15 can fit just under the entrance to a horizontal conduit space to "lock" the flange portion 15 into place. The degree of lock will depend upon a variety of factors, including width of the conduit space, availability of other structures, and the combined shape and spacing of the rib 25 and the flange portion 15.

Where a vertical conduit space is available, there may be other structures upon which the rib 25 can interfit. Further, rib 25 represents useful structure which can perform several functions. First, where the conduit space is wider than would form a snug fit with the flange portion, the combination of widths of the flange portion 15 and rib 25, particularly where these two structures may be bent toward each other, helps to form an anchoring structure which can accommodate some variability in conduit space. Second, where a wide anchoring space is available, the flange portion 15 can be compressed to form a spring structure with single or multiple undulations and which can provide upward pressure against the rib 25 as it engages some other structure. Where this action is present, installation will occur with a "clicking" or "snap" feedback to the installer, indicating a successful placement.

Third, note that the rib 25 is somewhat below the conduit portion 13. This is important in installations with carpeting where the conductor structure 11 needs to be sufficiently high and above the carpeting or other obstruction level. The rib 25, as will be seen, will exist as single or multiple structures and will lie along the flange portion 15. In FIGS. 1 and 2 it is shown at the top of the flange portion 15. Fourth, the reduced area cross section 29 enables the removal of the conductor structure 11 from a conduit space to which the flange portion 15 is "stuck" or attached. In this case, the conductor structure 11 is separated from the flange portion 15 by controlled tearing of the reduced area cross section 29. Where only a short portion of the flange portion 15 is "stuck", the adjacent sections of flange portion 15 will not continue to be torn away from the conduit portion 13 due to the presence of vertical notches 27. In addition, the flange portion 15 can be selectively torn away when the flange portion 15 is not needed. The vertical notches 27 can provide a "through" space, actually dividing flange portion 15 into segments, or it can be an incomplete notch, creating a reduced area cross section from which adjacent sections of the flange portion 15 can be "torn" away. This prevents a stuck section of flange portion 15 from harmfully grabbing the overall conductor structure 11 and perhaps tearing the main volume of insulative material which could expose the wires.

Figure 3:
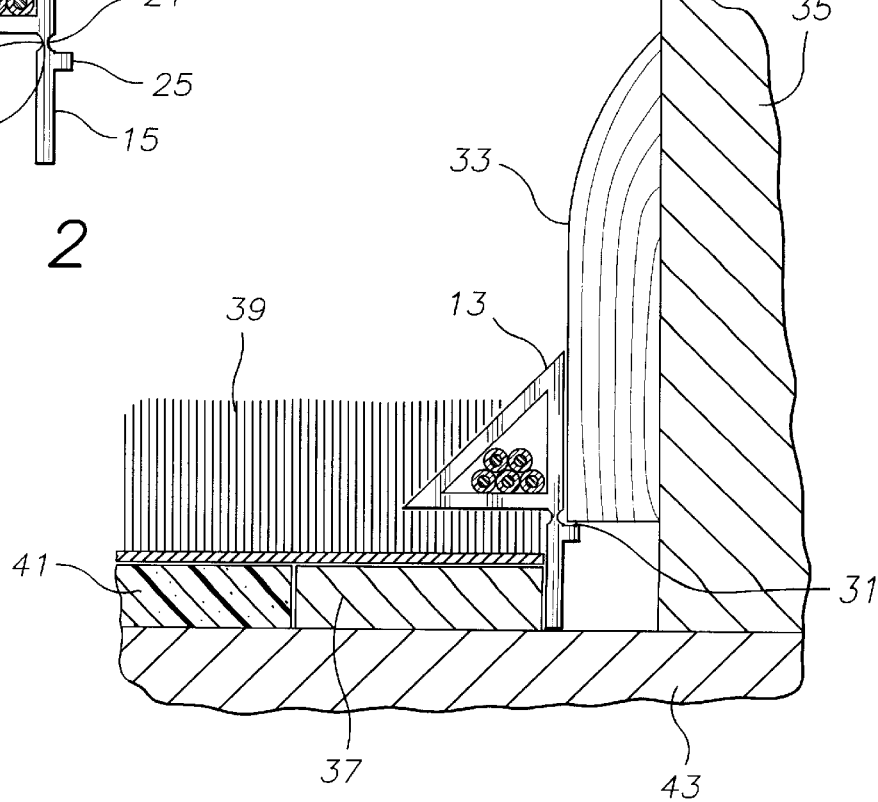
FIG. 3 is a sectional view of a floor, wall, and carpet and illustrating how the conduit of FIGS. 1 and 2 would be implaced in a typical application having a base board and wall structure.

Referring to FIG. 3, a view is shown where the rib 25 engages a notch 31 along the bottom of base molding 33 attached to a wall 35. To the left of the base molding 33 is a length of carpet tacking 37 which supports carpeting 39. A length of carpet padding 41 lies to the left of the carpet tacking 37, and both lie over the floor 43. FIG. 3 is an example in which the notch 31 engages the rib 25 and in which the flange portion 15 is springlingly bent to put some pressure against the notch 31-rib is 25 engagement.

Referring to FIG. 4, an example of the conductor structure 11 in a corner environment is illustrated with the carpet 39 removed in order to illustrate how easily the structure of the invention can corner accommodate and extend through a corner turn. The locking mechanism provided by the rib 25 nearly doubles its holding ability at a corner, by virtue of additional outward forces opposing the bending.

Referring to FIG. 5, a conductor structure 51 is shown having a flange portion 53 having a pair of ribs 55. Again, the notches 21 and 23 are present creating the reduced area cross section 29, although a reduced cross sectional connection area is one variation and as will be seen this is a separate embodiment from one not having such reduced cross sectional area. Here the ribs 55 are parallel and spaced apart. The operational idea in FIG. 5 is two. First, the operative rib 55 may be located much lower on the flange portion 53. Second, two or more ribs 55 may be used. In some sections of the wall 35, a notch 31 may be located lower down or higher up, especially with respect to the floor 43. Where the notch 31 is higher, it will be easily engageable by the upper of the two ribs 55 shown. Where the notch 31 is lower, the lower of the two ribs 55 may be more advantageous for engagement. Three or more ribs may be used.

Referring to FIG. 6, a conductor structure 61 is shown having a flange portion 63 having a single triangular shaped rib 65. The rib 65 is positioned to have a horizontal top profile portion and an angled lower portion. This forms a small continuous ratchet which makes the conductor structure 61 easier to install and slightly more difficult to de-install, as is the case where any one-sided locking mechanism is used. Again, the notches 21 and 23 are present creating the reduced area cross section 29, although a reduced cross sectional connection area is but one variation.

Referring to FIG. 7, a conductor structure 71 is shown having a flange portion 53 having a pair of triangular shaped ribs 65. Again, the notches 21 and 23 are present creating the reduced area cross section 29, although a reduced cross sectional connection area is but one variation. Here the ribs 55 are parallel, of even extent and angle and are spaced apart. They may be of different extent, angle and located closely together or spaced apart.

Referring to FIG. 8, a conductor structure 81 is shown having a curved flange portion 83, when view from the transverse direction and curving underneath the conduit portion 13. The curved flange portion 83 has a single rectangular shaped rib 85 which extends generally perpendicularly with respect to the section of the curved flange portion 83 from which it extends. The formed curvature of the curved flange portion 83 assists in helping an installer to have the flange portion 83 consistently bend in one direction. Again, the opposing notches 21 and 23 are present creating the reduced area cross section 29 previously seen.

Referring to FIG. 9, a conductor structure 91 is shown having a curved flange portion 93, when view from the transverse direction and curving underneath the conduit portion 13. The curved flange portion 93 has a pair of rectangular shaped ribs 95 which extends generally perpendicularly with respect to the section of the curved flange portion 93 from which it extends. The formed curvature of the curved flange portion 93 assists in helping an installer to have the flange portion 93 consistently bend in one direction, underneath the conduit portion 13. Again, the opposing notches 21 and 23 are present creating the reduced area cross section 29 previously seen.

Referring to FIG. 10, a conductor structure 101 is shown having a curved flange portion 103, when view from the transverse direction and curving toward the back side of and away from a direction underneath the conduit portion 13. The curved flange portion 103 has a single rectangular shaped rib 105 which extends generally perpendicularly with respect to the section of the curved flange portion 103 from which it extends. The formed curvature of the curved flange portion 103 assists in helping an installer to have the flange portion 103 consistently bend in one direction, away from the area underneath the conduit portion 13. Again, the opposing notches 21 and 23 are present creating the reduced area cross section 29 previously seen.

Referring to FIG. 11, a conductor structure 111 is shown having a curved flange portion 113, when view from the transverse direction and curving toward the back side of and away from a direction underneath the conduit portion 13. The curved flange portion 113 has a pair of rectangular shaped ribs 115 which extend generally perpendicularly with respect to the section of the curved flange portion 113 from which it extends. The formed curvature of the curved flange portion 113 assists in helping an installer to have the flange portion 113 consistently bend in one direction, away from the area underneath the conduit portion 13. Again, the opposing notches 21 and 23 are present creating the reduced area cross section 29 previously seen.

Referring to FIG. 12, a conductor structure 121 is shown having a split tailed flange portion including a vertical tail portion 123 and a curved tail portion 125, when view from the transverse direction. The curved tail portion 125 curves toward the front side of and in a direction underneath the conduit portion 13. The vertical tail portion 123 has a single rectangular shaped rib 127 which extends generally perpendicularly with respect to the section of the vertical tail portion 123 from which it extends. The split nature of the flange, including the curved tail portion 125 and vertical tail portion 123 assists in helping an installer to accommodate relatively large flange spaces. The opposing notches 21 and 23 are present creating the reduced area cross section 29 previously seen.

Referring to FIG. 13, a conductor structure 131 is shown having a curved flange portion 133, when view from the transverse direction and curving underneath the conduit portion 13. The curved flange portion 133 has a single triangular shaped rib 135 which extends generally perpendicularly with respect to the section of the curved flange portion 133 from which it extends. The formed curvature of the curved flange portion 133 assists in helping an installer to have the flange portion 133 consistently bend in one direction. Again, the opposing notches 21 and 23 are present creating the reduced area cross section 29 previously seen.

Referring to FIG. 14, a conductor structure 13 is shown having a curved flange portion 143, when view from the transverse direction and curving underneath the conduit portion 13. The curved flange portion 143 has a pair of triangular shaped ribs 145 which extends generally perpendicularly with respect to the section of the curved flange portion 143 from which it extends. The formed curvature of the curved flange portion 143 assists in helping an installer to have the flange portion 143 consistently bend in one direction, underneath the conduit portion 13.

Referring to FIG. 15, a conductor structure 151 is shown having a curved flange portion 153, when view from the transverse direction and curving toward the back side of and away from a direction underneath the conduit portion 13. The curved flange portion 153 has a single triangular shaped rib 155 which extends generally perpendicularly with respect to the section of the curved flange portion 153 from which it extends.

Referring to FIG. 16, a conductor structure 161 is shown having a curved flange portion 163, when view from the transverse direction and curving toward the back side of and away from a direction underneath the conduit portion 13. The curved flange portion 163 has a pair of triangular shaped ribs 165 which extend generally perpendicularly with respect to the section of the curved flange portion 113 from which it extends.

Referring to FIG. 17, a conductor structure 171 is shown having a split tailed flange portion including a vertical tail portion 173 and a curved tail portion 175, when view from the transverse direction. The curved tail portion 175 curves toward the front side of and in a direction underneath the conduit portion 13. The vertical tail portion 173 has a single triangular shaped rib 177 which extends generally perpendicularly with respect to the section of the vertical tail portion 173 from which it extends. Again, the dual tail portions 173, 175 assist in helping an installer to accommodate relatively large flange spaces.

Referring to FIG. 18, a further embodiment is shown as a variation on the embodiments earlier seen and in which the flange member is generally straight, but angled with respect to its extension away from the conduit portion 13. Where the flange is sufficiently flexible, the angled orientation will help produce consistency in the installation.

A conductor structure 181 is shown having a single, angled flange portion 183 angled to be located underneath the conduit portion 13. The flange portion 183 has a single rectangular rib 185 which may be located at any position along the length of the flange portion 183. Referring to FIG. 19, a further embodiment is shown as a conductor structure 191 is shown having a single, angled flange portion 193 angled to be located underneath the conduit portion 13. The flange portion 193 has a pair of rectangular ribs 195 which may be located at any position along the length of the flange portion 193. Referring to FIG. 20, a conductor structure 201 is shown having a single, angled flange portion 203 angled in a direction away from the area underneath the conduit portion 13. The flange portion 203 has a single rectangular rib 205 which may be located at any position along the length of the flange portion 203.

Referring to FIG. 21, a conductor structure 211 is shown having a single, angled flange portion 213 angled in a direction away from the area underneath the conduit portion 13. The flange portion 213 has a pair of rectangular shaped ribs 215 which may be located at any position along the length of the flange portion 213.

Referring to FIG. 22, a conductor structure 221 is shown having a split angled flange portion including a vertical straight tail portion 223 and an angled straight tail portion 225, when viewed from the transverse direction. The straight tail portion 225 is angled toward the front side of and in a direction underneath the conduit portion 13. The straight tail portion 223 has a pair of rectangular shaped ribs 227 which extends generally perpendicularly with respect to straight tail portion 223.

Referring to FIG. 23, a conductor structure 231 is shown having a solid conduit portion 233 which supports individually insulated wires 17, although bare wires could also be supported. The use of individually insulated wires will assist in terminating the individual conductors at a terminal box or connector, relieving the necessity to individually insulated the conductors near their terminal portions. In addition, the solid conduit portion is shaped as an arc extending between the end of a horizontal surface at the front side and the end of a vertical surface at the back side.

Conductor structure 231 has a curved flange portion 235, when viewed from the transverse direction and curving underneath the conduit portion 233. The curved flange portion 235 has a single rectangular shaped rib 237 which extends generally perpendicularly with respect to the section of the curved flange portion 235 from which it extends. The formed curvature of the curved flange portion 235 assists in helping an installer to have the flange portion 235 consistently bend in one direction. Again, the opposing notches 21 and 23 are present creating the reduced area cross section 29 previously seen.

Referring to FIG. 24, a conductor structure 241 is shown having a curved flange portion 243, when view from the transverse direction and curving underneath the conduit portion 233. The curved flange portion 243 has a pair of rectangular shaped ribs 245 which extend generally perpendicularly with respect to the section of the curved flange portion 243 from which it extends.

Referring to FIG. 25, a conductor structure 251 is shown having a curved flange portion 253, when viewed from the transverse direction and curving away from a position underneath the conduit portion 233. The curved flange portion 253 has a single rectangular shaped rib 255 which extends generally perpendicularly with respect to the section of the curved flange portion 253 from which it extends.

Referring to FIG. 26, a conductor structure 261 is shown having a curved flange portion 263, when view from the transverse direction and curving underneath the conduit portion 233. The curved flange portion 263 has a pair of rectangular shaped ribs 265 which extend generally perpendicularly with respect to the section of the curved flange portion 263 from which it extends.

Referring to FIG. 27, a conductor structure 271 is shown having a split tailed flange portion including a vertical tail portion 223 and a curved tail portion 225, when view from the transverse direction. The curved tail portion 225 curves toward the front side of and in a direction underneath a conduit portion 227 which is a hollow conduit having an external shape the same as conduit portion 233, but also having an internal space 228 for carrying the wires 17. The vertical tail portion 223 has a single rectangular shaped rib 229 which extends generally perpendicularly with respect to the section of the vertical tail portion 223 from which it extends. The split nature of the flange, including the curved tail portion 225 and vertical tail portion 223 assists in helping an installer to accommodate relatively large flange spaces.

Referring to FIG. 28,, an end view of an open conductor structure 281 illustrates an open conduit portion 283 supporting several wires 17. The conduit space 19 opens at a lateral opening 285. This enables the user to add or remove the wires 17 as necessary, especially laterally, without having to insert the wires in the end of the open conduit portion 283. The lateral opening 285 enables the structure 281 to be purchased as a stand-alone structure within which the user can add wiring to his needs, including coax, telephone wires, and the like. In addition, the user can buy the structure 281 to accommodate existing wiring to cover and better support such wiring.

Conductor structure 281 is shown having a straight flange portion 287, when viewed from the transverse direction extends straight down and generally parallel to the rear side of the conduit portion 283. The straight flange portion 287 has a single rectangular shaped rib 289 which extends generally perpendicularly with respect to the section of the straight flange portion 287 from which it extends. Referring to FIG. 29, a further embodiment is shown as an open conductor structure 291 and has an open conduit portion 283, again supporting several wires 17. The conduit space 19 opens at a lateral opening 285. Conductor structure 281 is shown having a straight flange portion 297, and having a pair of rectangular shaped ribs 299 which extends generally perpendicularly with respect to the section of the straight flange portion 297 from which it extends.

Referring to FIG. 30, an end view of a further embodiment of a conductor structure is shown as conductor structure 301 having an enclosed conduit portion 303 supporting several wires 17. A small linear portion 305 of the conduit portion 303 tangentially extends away from the conduit portion 303 and provides support for a straight flange portion 307. The straight flange portion 307 has a single rectangular shaped rib 309.

Referring to FIG. 31, an end view of a further embodiment of a conductor structure is shown as conductor structure 311 having an enclosed conduit portion 313 supporting several wires 17. A small linear portion 305 of the conduit portion 313 is also present, and a straight flange portion 335 has a single rectangular shaped rib 309.

Referring to FIG. 32 a view is shown the embodiment of FIG. 30 where the rib 309 engages notch 31 along the bottom of base molding 33 attached to a wall 35, similar to that shown in FIG. 3.

Figure 33:
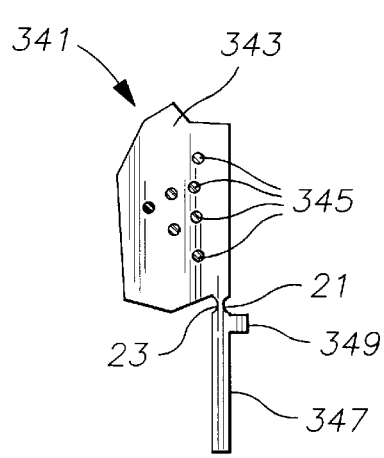
FIG. 33 is an irregularly shaped conductor structure having a solid conduit portion carrying a series of spaced apart conductors, and having a single straight flange with a single rectangular anchoring structure.

Referring to FIG. 33, an irregularly shaped conductor structure 341 has a solid conduit portion 343 which may carry a series of spaced apart conductors 345. The external surface of the solid conduit portion 343 may be made of a variety of shapes to cooperate with a variety of base molding 33 and wall 35 styles. A straight, downwardly extending flange portion 347 has a single rectangular shaped rib 349. The notches 21 and 23 are also present.

Figure 34:
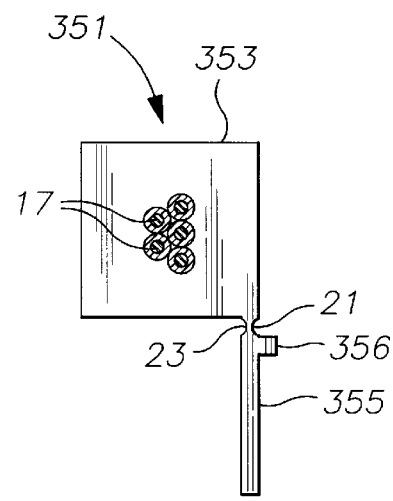
FIG. 34 is an rectangular cross shaped conductor structure having a solid conduit portion carrying a series of spaced apart conductors, and having a single straight flange with a single rectangular anchoring structure.

Referring to FIG. 34, a rectangularly shaped conductor structure 351 has a solid conduit portion 353 which may carry a series of spaced apart wires 17. A straight, downwardly extending flange portion 355 has a single rectangular shaped rib 357. The notches 21 and 23 are also present.

Figure 35:
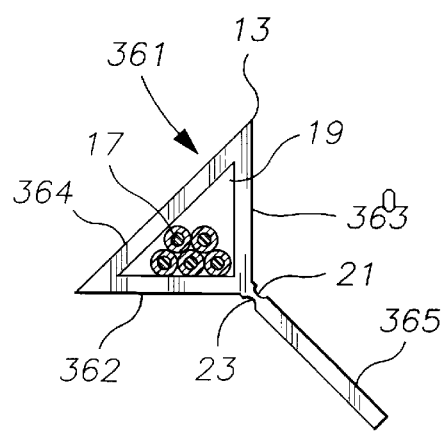
FIG. 35 is a conduit having a triangularly shaped conduit portion and a flange which extends away from a corner of the triangularly shaped conduit at a 45° angle from the legs and perpendicular to the hypotenuse of the triangle and having a single straight flange with a thinned area of material due to a pair of notches.

Referring to FIG. 35, a closed triangularly shaped conductor structure 361 has conduit portion 13 which may carry a series of wires 17. The overall shape of the conduit portion is defined by a horizontal bottom side 362, a vertical back side 363 and a sloping hypotenuse, or front side 364. A flange portion 365 extends down and away from the junction of the bottom side 362 and the back side 363 at a 45° angle with respect to each of the sides 362 and 363.

In a conductor structure of the class of conductor structure 361, the flange portion 365 will generally extend away from the conduit portion 13 at an angle equilateral from the meeting point of the two sides, in this case 362 and 363. One formula which helps to define this is to state that the angle of the flange portion 365 with respect to both of the sides 362 and 363 will be 180° minus half of the angle with which the sides 362 and 363 meet. For example, where the sides 362 and 363 meet at a 90° angle, the angle of the flange portion 365 with respect to either of the walls 362 or 363 will be 180°−(90°/2)=135°. Likewise for a conduit portion having an equilateral triangular shape, the two sides will meet at a 60° angle, and the angle with respect to either of the adjacent walls will be 180°−(60°/2)=150°. Having the flange portion, such as 365 bisect the meeting angles of the adjacent walls provides maximum utility and enables the flange portion 365 to be bent in either direction which is most advantageous depending upon the particulars of the installation desired. This overcomes any problems associated with the reversibility required with left or right handed applications.

Notches 21 and 23 are present, although they are likewise turned 45°, but keep their orientation with respect to the length of the flange portion 365. This angled orientation of the flange portion 365 enables the conduit structure 361 to be easily attached into flange spaces which are vertical, horizontal, and in between. Further, it enables the conduit structure 361 to be used in two configurations most easily illustrated using the triangular shape of FIG. 35, which is triangular for illustrative purposes. For example, where side 362 is twice as short as side 363, the conduit structure 361 can be flipped to more evenly match the available space.

Figure 36:
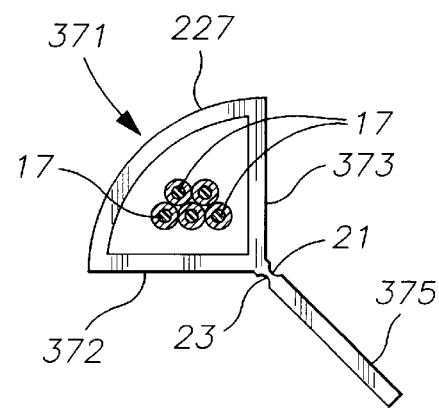
FIG. 36 is a conduit having an arc shaped conduit portion and a flange which extends away from a corner of the triangularly shaped conduit at a 45° angle from the legs and perpendicular to the arc shaped side of the conduit portion and having a single straight flange with a thinned area of material due to a pair of notches.

Referring to FIG. 36, a closed arc segment shaped conductor structure 371 has conduit portion 227 as was shown in FIG. 27, and may carry a series of wires 17. The overall shape of the conduit portion 227 is defined by a horizontal bottom side 372, a vertical back side 373 and an arc side 374 arcing between the ends of the bottom side 372 and the back side 373. A flange portion 375 extends down and away from the junction of the bottom side 372 and the back side 373 at a 45° angle with respect to each of the sides 372 and 373.

Figure 37:
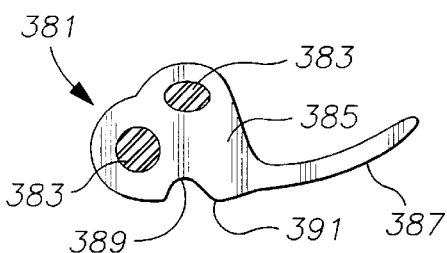
FIG. 37 is a sectional view of an irregularly shaped conduit having a solid section for carrying a pair of conductors, especially for power usage and having an angled anchoring structure and a slightly curved flange.
Figure 38:
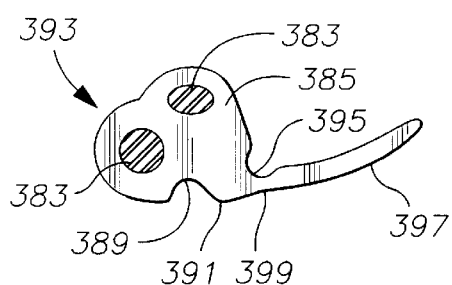
FIG. 38 is a sectional view of an irregularly shaped conduit having a solid section for carrying a pair of conductors, especially for power usage and having an angled anchoring structure and a slightly curved flange connected by a thinned area resulting from the presence of a single notch.

Referring to FIG. 37, an irregularly shaped conductor structure 381 has a more natural shape, but incorporates many of the structures previously described. It has a pair of conductors 383 suspended within a unitary body 385. A flange portion 387 is continuous with the body 385. A naturally formed notch 389 defines an engagement surface 391 which functions similar to the top surface of one of the rectangular ribs 25 previously described. A conduit structure 393 is shown in FIG. 38, but having a single groove 395 formed in one side of a flange portion 397 to produce a reduced area of material 399 with which to enable a "tearing away" of the conduit portion 385. Placement of notch 389 also helps during installation where the insulation material separating the conductors 383 is to be stripped away to expose the bare conductors 383.

Figure 39:
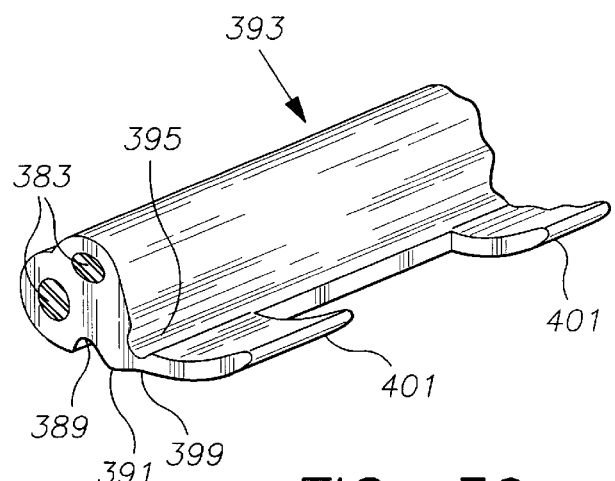
FIG. 39 is a perspective view of the irregularly shaped conduit of FIG. 38 and illustrating removal of material such that the flange portion extends from the conduit intermittently along the length of the conduit.

Referring to FIG. 39, a perspective view of the conduit structure 393 illustrates a variation wherein the flange portion 397 is formed as a series of individual structures periodically occurring flange structure portions 401 along its length. The groove 395 is still present to produce the reduced area of material 399 with which to enable a "tearing away" of the conduit portion 385 from one or more of the periodically occurring flange structure portions 401.

Figure 40:
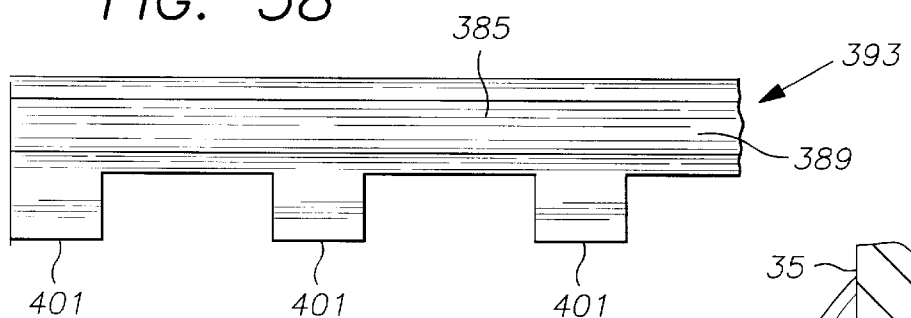
FIG. 40 is a rear view of the conduit shown in FIG. 39 to better illustrate the intermittent nature of the flange portions along the length of the conduit.

Referring to FIG. 40, a view of the conduit structure 393 from the rear side illustrates the periodicity of the flange structure portions 401 and the notch 389 can be seen.

Figure 41:
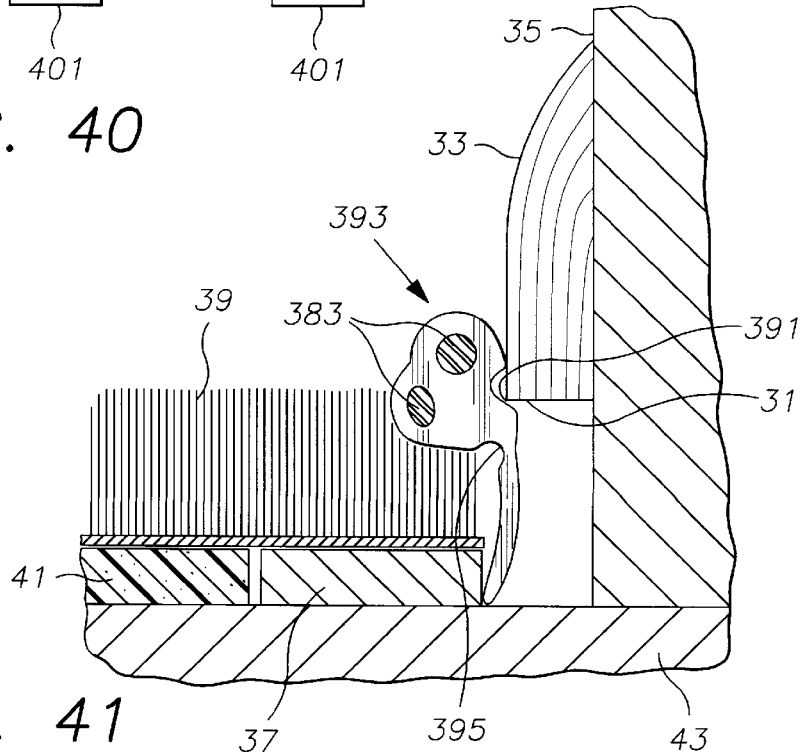
FIG. 41 is a sectional view of a floor, wall, and carpet and illustrating how the conduit of FIGS. 38–40 would be implaced in a typical application having a base board and wall structure.
Figure 45:
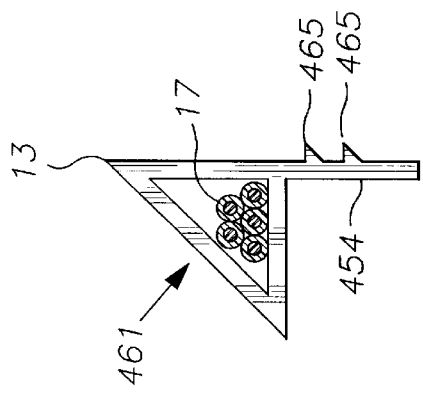
FIG. 45 is a variation on FIG. 7 and having a pair of spaced apart anchoring structures of right triangular shape, with a straight connection between the flange portion and the conduit portion.
Figure 44:
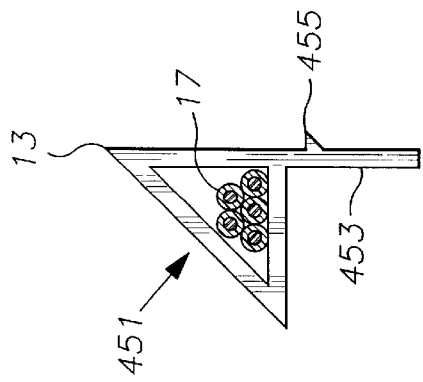
FIG. 44 is a variation of FIG. 6 where the a single anchoring structure has a right triangular shape when viewed in cross section, with a straight connection between the flange portion and the conduit portion.
Figure 43:
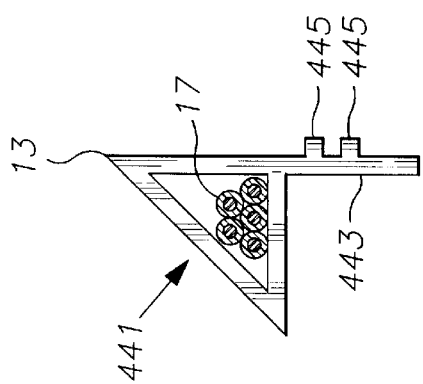
FIG. 43 a variation of FIG. 5 and having a pair of anchoring structures extending from a straight flange, one anchoring structure spaced above the other, with a straight connection between the flange portion and the conduit portion.

Referring to FIG. 41, a view similar to that of FIGS. 3 and 33 illustrates the placement of the conduit structure 393.

Figure 42:
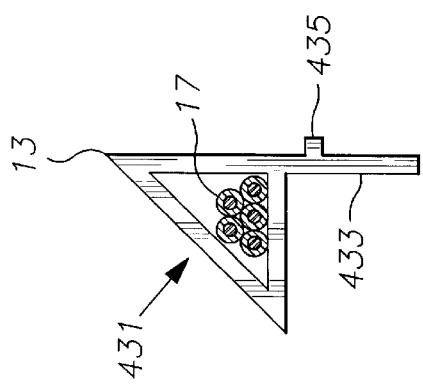
FIG. 42 is a sectional view of a conduit member similar to that shown in FIG. 2, with a straight connection between the flange portion and the conduit portion.
Figure 56:
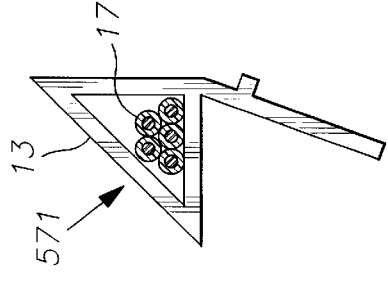
FIG. 56 illustrates a conduit portion having an angled elongate flange structure, with a straight connection between the flange portion and the conduit portion and a single rectangular shaped anchoring structure.
Figure 57:
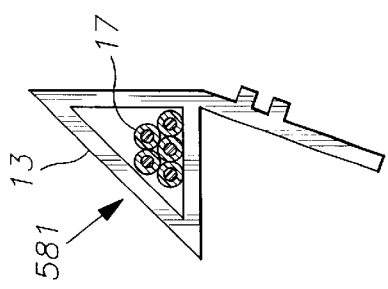
FIG. 57 illustrates a conduit portion having an angled elongate flange structure, with a straight connection between the flange portion and the conduit portion and a pair of rectangular shaped anchoring structures.
Figure 58:
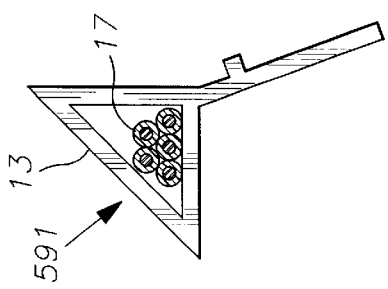
FIG. 58 illustrates a conduit portion having an angled elongate flange structure, with a straight connection between the flange portion and the conduit portion and a single rectangular shaped anchoring structure.
Figure 59:
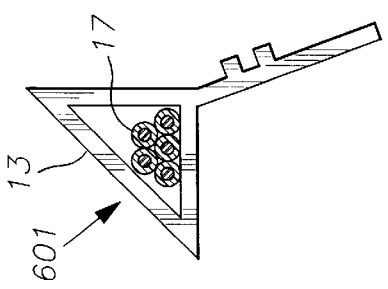
FIG. 59 illustrates a conduit portion having an angled elongate flange structure, with a straight connection between the flange portion and the conduit portion and a pair of spaced apart rectangular shaped anchoring structures.
Figure 60:
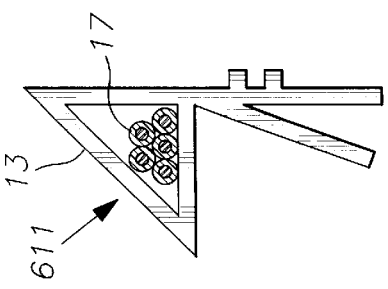
FIG. 60 illustrates a conduit portion having a split flange structure, with a straight connection between the flange portion and the conduit portion, with a straight connection between a split flange portion having an inwardly angled portion and a straight portion having a pair of rectangular shaped anchoring structures.
Figure 61:
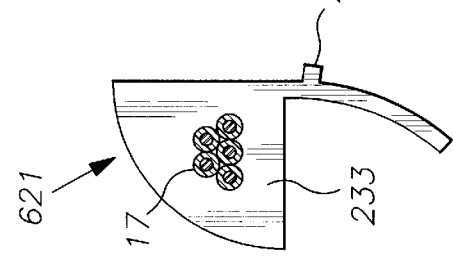
FIGS. 61 illustrates a conduit having a solid fill conduit portion and an inwardly curving flange portion, with a straight connection between a split flange portion having an inwardly angled portion and a straight portion and having a single rectangular anchoring structure.
Figure 62:
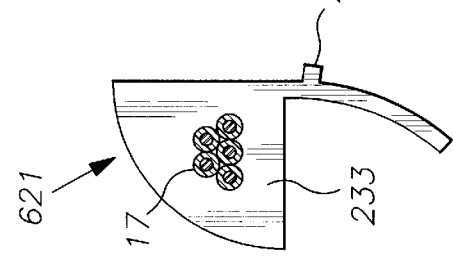
FIG. 62 illustrates a conduit having a solid fill conduit portion and an inwardly curving flange portion, with a straight connection between a split flange portion having an inwardly angled portion and a straight portion and having a pair of rectangular anchoring structures.
Figure 63:
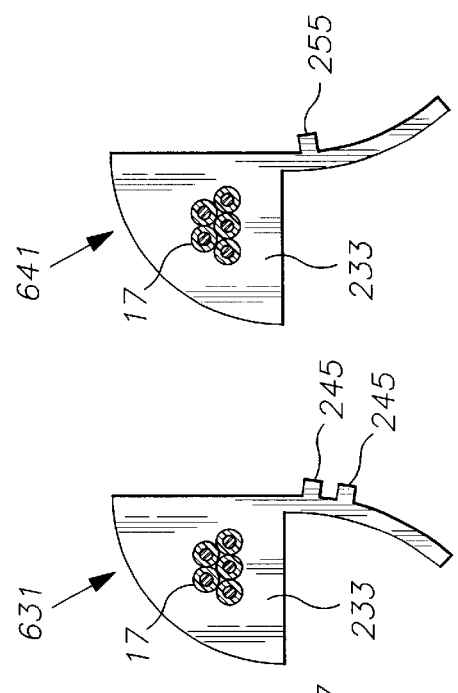
FIG. 63 illustrates a conduit having a solid fill conduit portion and an outwardly curving flange portion, with a straight connection between a split flange portion having an inwardly angled portion and a straight portion and having a single rectangular anchoring structure.
Figure 64:
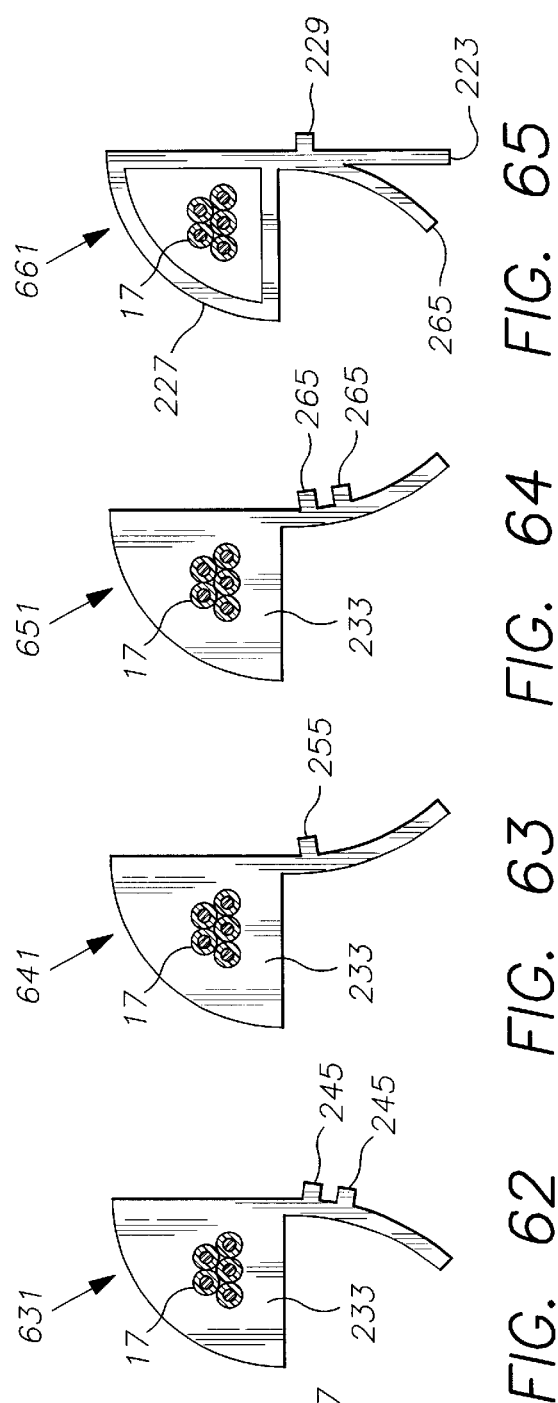
FIG. 64 illustrates a conduit having a solid fill conduit portion and an outwardly curving flange portion, with a straight connection between a split flange portion having an inwardly angled portion and a straight portion and having a pair of spaced apart rectangular anchoring structures.
Figure 65:
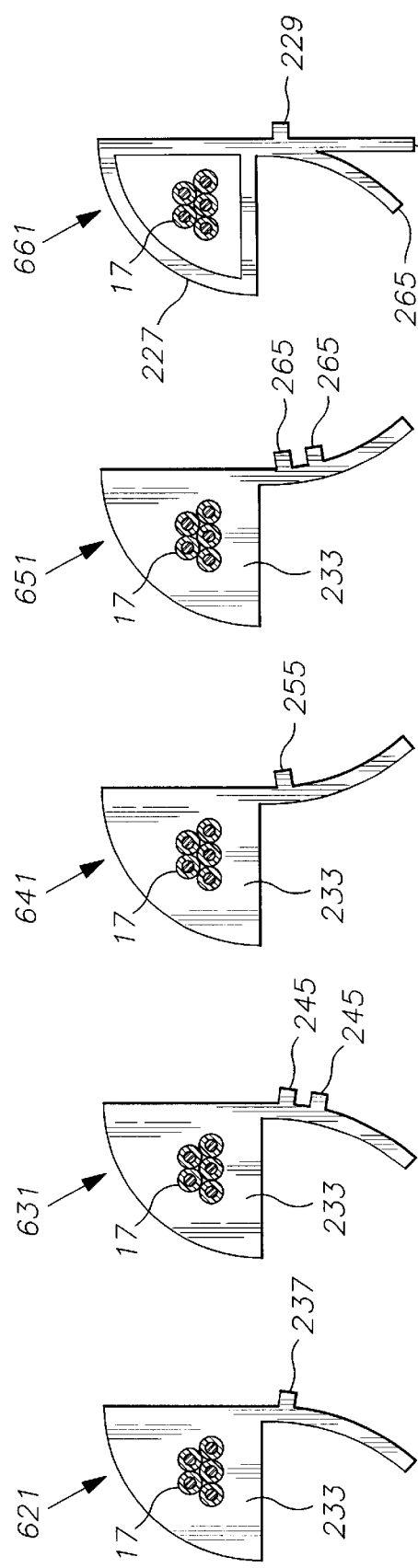
FIG. 65 illustrates a conduit having a hollow arc shaped conduit portion and having a split flange structure including an inwardly curving portion, with a straight connection between a split flange portion having an inwardly angled portion and a straight portion and a straight portion and having a single rectangular anchoring structure.

Beginning with FIG. 42, a version of the conduit structures previously shown are further illustrated without the pair of opposing notches 21 and 23. FIGS. 42, 43, 44, 45, show versions of conduit structures 431, 441, 451, and 461 related to the conduit structures 11, 51, 61 and 71 of FIGS. 2, 5, 6, & 7. The conduit structures 431, 441, 451, and 461 have integrally formed flange portions 433, 443, 453, and 463, which have rectangular ribs 435, 445, or triangular ribs 455, 465.

Likewise, FIGS. 46–73 illustrate conduit structures not having the pair of opposing notches 21 and 23, and FIGS. 47–74 correspond to FIGS. 8–36. FIGS. 46–73 illustrate conduit structures 471, 481, 491, 501, 511, 521, 531, 541, 551, 561, 571, 581, 591, 601, 611, 621, 631, 641, 651, 661, 671, 681, 691, 701, 711, 721, 1731, and 741. The other numbering will be correspondingly the same as FIGS. 8–36.

Figure 74:
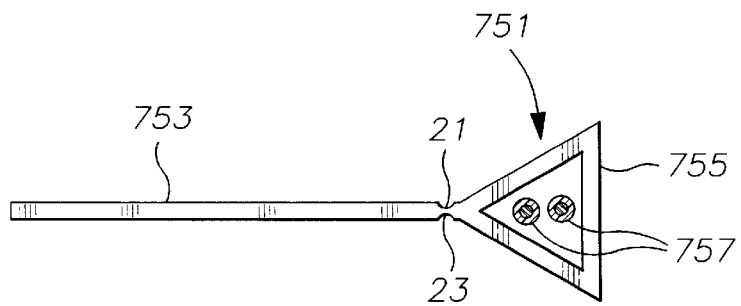
FIG. 74 is a conduit having a hollow inside area for carrying conductors and which has a reduced area portion defined by a pair of opposing notches, and an extended flange portion especially useful for placement under carpeting.

Referring to FIG. 74 a further embodiment is shown in looking into an end section as a conduit structure 751. Conduit structure 751. Conduit structure 751 has a hollow conduit portion 755 (which could also be solid) in which a pair of conductors 757 are supported. This application is also useful for transport of electrical power and particularly underneath structures and withing flange spaces which are elongate. One particular use is for support underneath carpeting and the like where the increased area of the elongate flange support 753 can help hold the conduit structure 751 in place. The pair of opposing notches 21 and 23 producing a reduced cross sectional area 29 are present between the elongate flange support 753 and the conduit portion 755.

Figure 75:
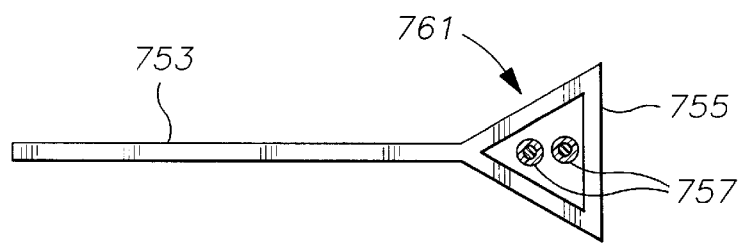
FIG. 75 is a conduit having a hollow inside area for carrying conductors and which has a reduced area portion defined by a pair of opposing notches, and an extended flange portion with a straight connection to the conduit portion and especially useful for placement under carpeting.

Referring to FIG. 75, a further embodiment is shown looking into an end section as a conduit structure 761. Conduit structure 761 is the same as was described for FIG. 74 except that the notches 21 and 23 are absent.

Figure 76:
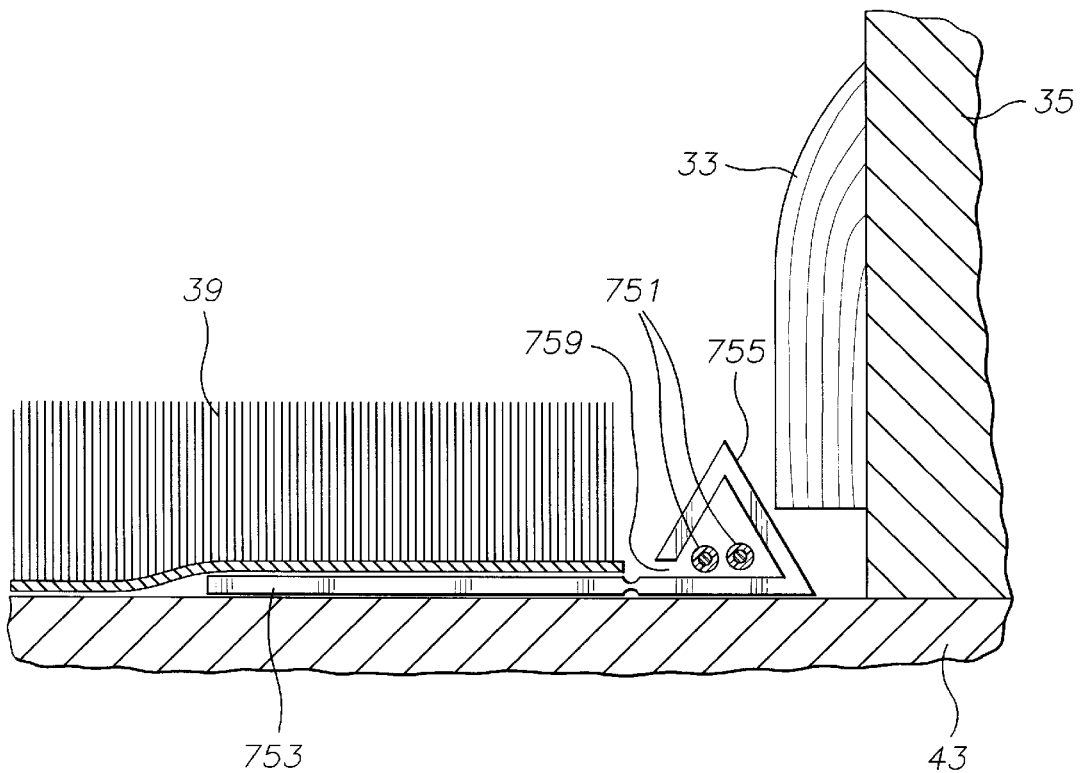
FIG. 76 is a sectional view of a floor, wall, and rug and illustrating how the conduit of FIGS. 75 & 76 would be implaced in a typical application having a base board and wall structure.

Referring to FIG. 76, an example of the conduit structure 751 shown in place underneath carpet 39 and adjacent to a base board or molding 33. In practice, this configuration would also function well where electrical line needs to be placed along the edge of carpet in an open area. It would provide a finished look to the edge of the carpet while at the same time extend power or other electrical signal along the carpet without the need for taping a bulky round cord to the floor 43.

Figure 77:
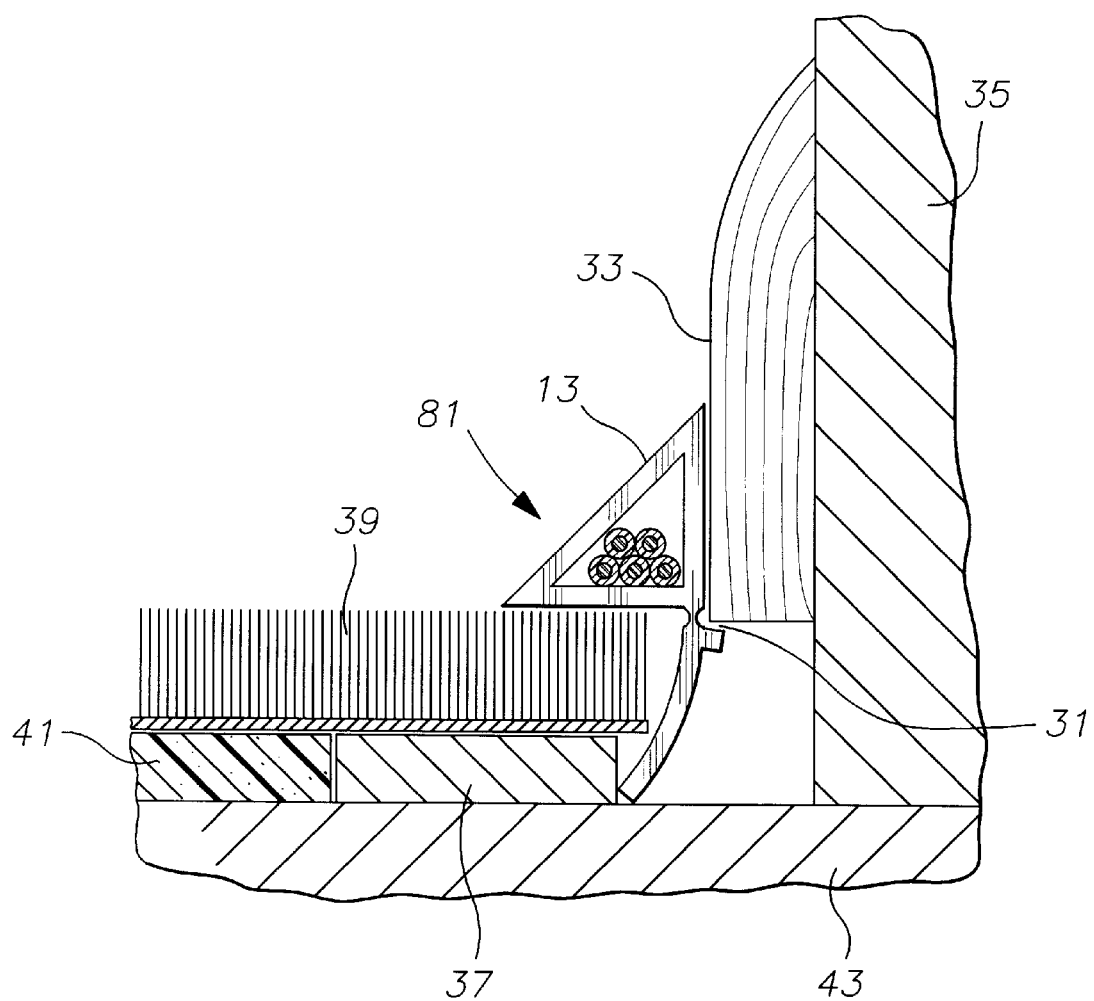
FIG. 77 is a sectional view of a floor, wall, and carpet and illustrating how the conduit of FIG. 8 would be implaced in a typical application having a base board and carpet structure.

Referring to FIG. 77, the conductor structure 81 of FIG. 8 is shown along the bottom of base molding 33 attached to a wall 35. To the left of the base molding 33 is a length of carpet tacking 37 which supports carpeting 39. The length of carpet padding 41 lies to the left of the carpet tacking 37, and both lie over the floor 42. Note that the conduit portion 13 lies at least partially above the carpet 39.

Figure 78:
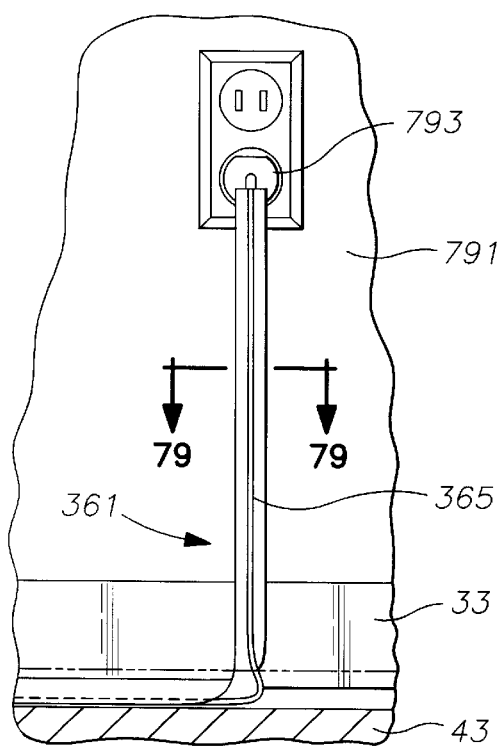
FIG. 78 illustrates the use of the conduit structure shown in FIG. 35 with a pair of conductors, and with the flange extending away from the wall, and used as power transmission wiring and extending from a wall plug, then turning at the bottom and engaging a space within a baseboard.

FIG. 78 illustrates the use of the conduit structure 361 shown in FIG. 36 with a pair of conductors, and with the flange 365 extending away from a wall 791, and used as power transmission wiring and extending from a wall plug 793, then turning at the bottom and engaging a space underneath base molding 33.

Figure 79:
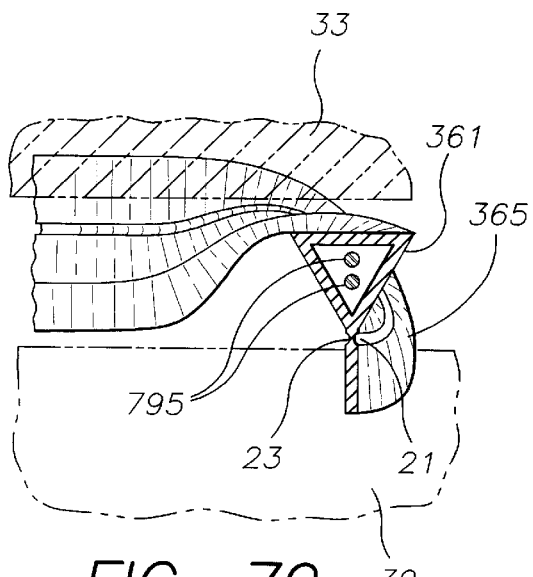
FIG. 79 illustrates a sectional view taken along line 79–70 of FIG. 78 and illustrating the twisting motion as the flange is brought around to engage the base board.

FIG. 79 illustrates a sectional view taken along line 79—79 of FIG. 78 and illustrating a pair of conductors 795 and a twisting motion of the conduit structure 361 as the flange is brought around to engage the base board; FIGS. 78 and 79 illustrate that the conduit structure 361 can extend either to the left or to the right and that the conduit structure 361 can twist about 160° in either direction and can thus extend horizontally in either direction at the lower extent of its vertical travel toward the floor.

Figure 80:
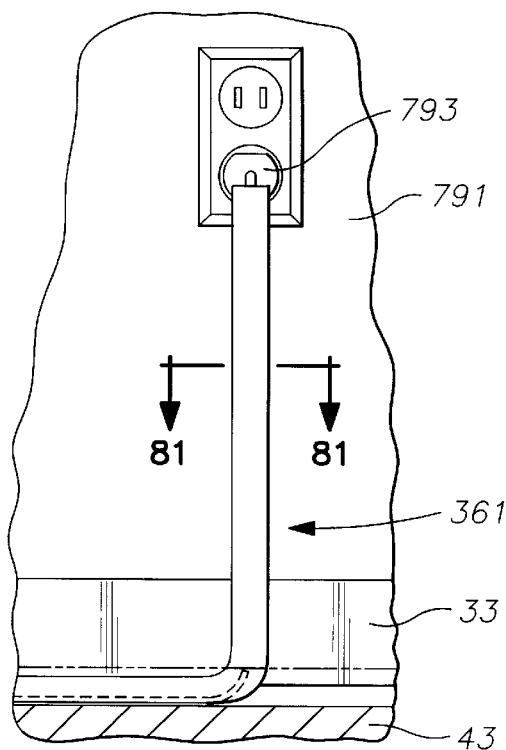
FIG. 80 illustrates the use of the conduit structure shown in FIG. 35 with a pair of conductors, and with the flange extending toward the wall and partially removed during the vertical extent of the conduit, and used as power transmission wiring and extending from a wall plug, then turning at the bottom and engaging a space within a baseboard.
Figure 81:
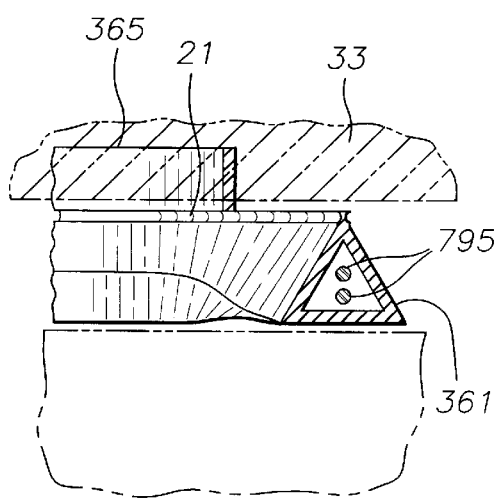
FIG. 81 illustrates a sectional view taken along line 81—81 of FIG. 80 and illustrating the turning motion as the continues near the base board and engages the space between the base board and floor.

FIG. 81 illustrates the use of the conduit structure 361 shown in FIG. 36 with a pair of conductors 795 as was seen in FIG. 79, but with the flange 365 extending toward the wall 791 and not seen in FIG. 80. In this orientation, not as much twisting is required at the lower extent of the travel at the floor 43. The plug 793 is simply reversed and all other aspects of the FIG. 80 are similar to that as was shown in FIG. 78.

FIG. 81 illustrates a sectional view taken along line 81—81 of FIG. 80 and illustrating a pair of conductors 795 and a very slight twisting motion of the conduit structure 361 to place it in position for the beginning of the flange 365 which occurs along the length of the conduit structure 361 near the floor 43. This illustrates the advantage of a tear away flange 365.

As a final showing of the advantages of a tear away flange such as flange 365, the conduit structure 361 is shown in transition from a horizontal extent with flange 365 engaged underneath the base molding 33, to a transition to a vertical portion between a vertical molding 831 and a wall 833. Beginning at the point of vertical transition, and continuing upward, the flange 365 is removed to enable the conduit structure 361 to fit in a corner 835 between the vertical molding 831 and wall 833. Although the corner 835 is presumably a 90° corner, and the mostly equilateral cross sectional shape of the conduit structure 361 is about 60°, and thus not a flush fit on any two adjacent sides, the removal of the flange 365 enables a sufficient fit so that undue twisting of the conduit structure 361 is not necessary. If twisting did occur, and with removal of the flange 365 over the vertical portion, the vertical extent for the majority of travel along the vertical molding 831 would appear the same.

Figure 83:
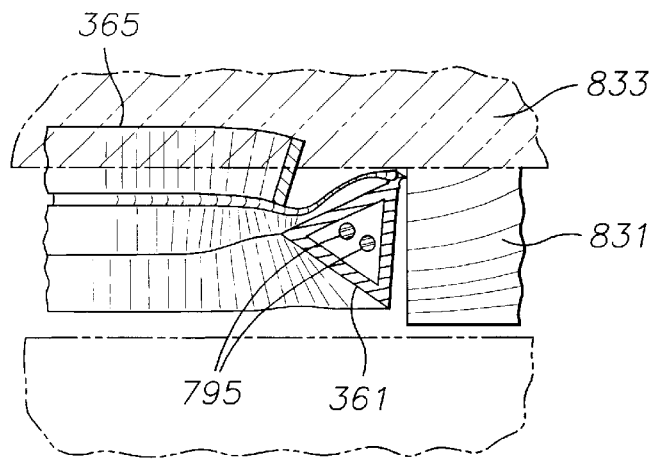
FIG. 83 is a view taken along line 83—83 of FIG. 82 and illustrating a slight twist to enable close conforming seating in the corner between wall and molding.
Figure 82:
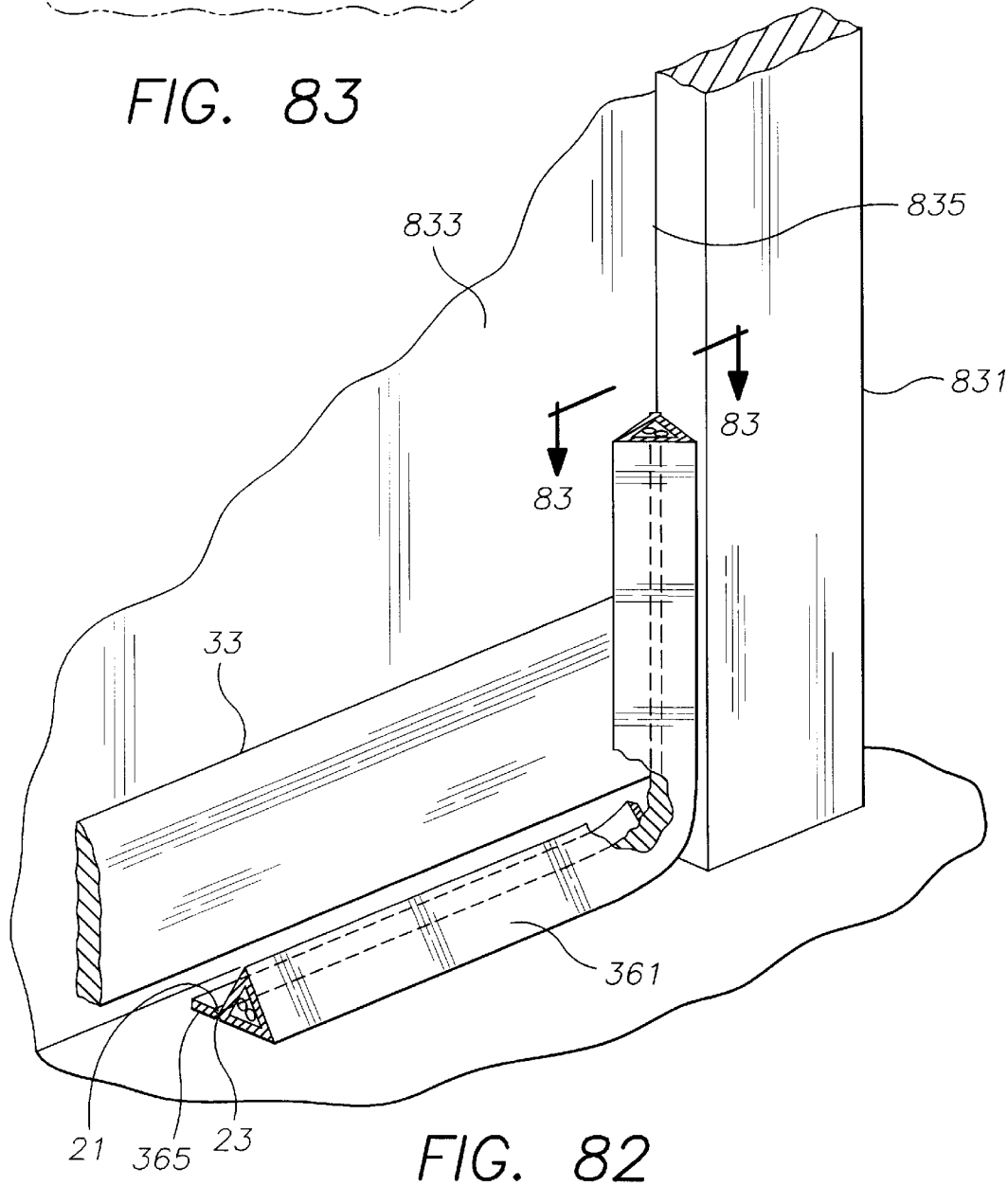
FIG. 82 illustrates the conduit of FIG. 35 in transition from horizontal engagement between a floor and base board to vertical placement between wall and molding and illustrating the advantage of removal of the flange when the conduit is not needed.

Referring to FIG. 83, a view along line 83—83 of FIG. 82 shows the extremely slight twisting which occurs as the terminal extent of the flange 365 is reached and the conduit structure 361 extends upward.

Figure 84:
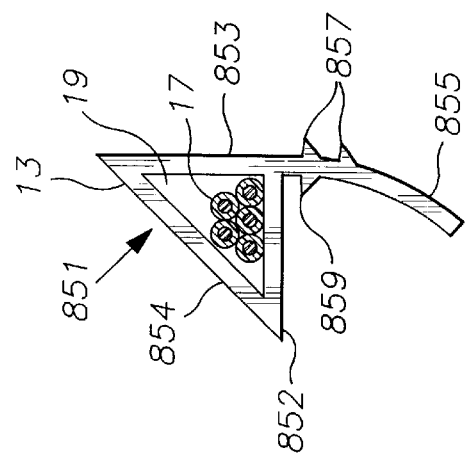
FIG. 84 is a variation showing a triangular rib located on both sides of the flange, even where the flange curves or extends underneath the conduit portion.

FIG. 84 illustrates a closed triangularly shaped conductor structure 851 having conduit portion 13 which may carry a series of wires 17. The overall shape of the conduit portion is defined by a horizontal bottom side 852, a vertical back side 853 and a sloping hypotenuse, or front side 854. A flange portion 855 carries a pair of triangular ribs 857 on the side of flange portion 855 continuous with back side 853, and a single triangularly shaped rib 859 on the side of the flange portion 855 adjacent horizontal bottom side 852. In this configuration, the conductor structure 851 can "hook" to the inside as well as "click" into and onto structures on both sides of the structure 851.

Figure 85:
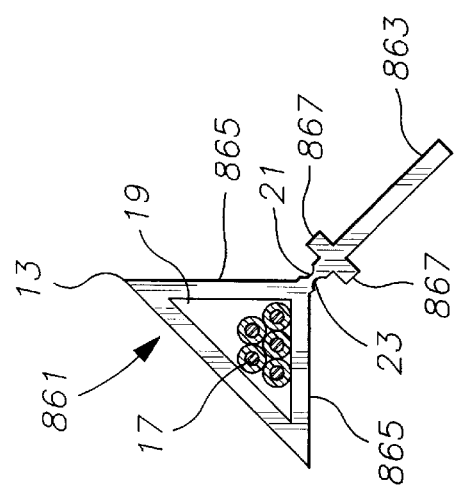
FIG. 85 illustrates a conduit design having a rectangular rib on either side of a flange extending at a 45° angle to form a structure which facilitates true ambidextrous or right and left hand orientation installation.

Referring to FIG. 85, a closed triangularly shaped conductor structure 861 has conduit portion 13 which may carry a series of wires 17. A flange portion 863 extends down and away at a 45° from the junction of a pair of sides 865. The notches 21 and 23 are present. A pair of rib structures 867 having rectangular shape oppositely extending from the flange 863 just below the notches 21 and 23, create a bi-laterally symmetrical structure, except for the insulated conductors 17 which may be carried within the conduit space 19. This design enables a single design of conductor structure, such as conductor structure 861 to be used both for right hand and left hand applications, as well as applications which require switching from one sided engagement to engagement on the other side, such as where a wire turns toward a reverse direction and the structure from which it depends is found to be on the other side.

Figure 86:
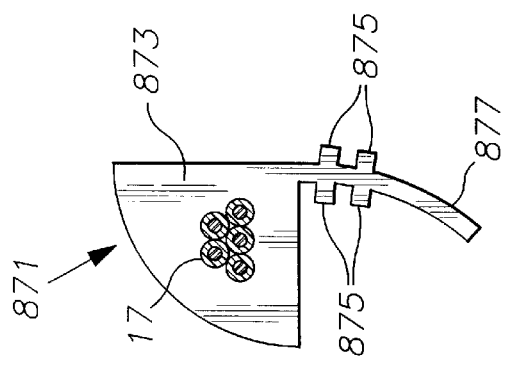
FIG. 86 illustrates a solid conduit having a flange with a pair of rectangular ribs on both sides of the flange.

FIG. 86 illustrates a solid conduit 871 having a solid conduit portion 873 and having two pairs of rectangular ribs 875, each pair of ribs extending from a different side of a flange 877. This configuration allows both "inside" and "outside" engagement of structures.

FIG. 87 is a plan view of the open side of an installation tool for installing the conduit of the invention and referred to as installation tool 901. The tool 901 is made in such a way that there can be a left and right hand model, what is expected to be the right hand model shown in FIG. 87. The plan view of FIG. 88 exposes the structural details of the tool 901. There are upper and lower planar surfaces 903 and 905, separated by a wall 907. An upper wall 909, together with wall 907 form structures extending toward the viewer of FIG. 87 with which the hand engages the tool 901.

A first slanted wall 911 sits opposite a second slanted wall 913. The walls 911 and 913 slant inward as they extend downwardly until a lower curved wall 915 is encountered. The width and possibly the shape of the lower surface of wall 915 (not seen in FIG. 87) is expected to match the installed conduit and abut conduit portions 13, 227, 233, 283, 303, 313, 343, 353, 385 and 755. Below wall 915, blade 917 extends downward. Blade 917 is the insertion working surface which clears the way for the conduit, including conduit 11, and all the types shown in the application to fit within spaces between at least one of a wall, a molding, a floor, a carpet, a rug, a baseboard and to clear any other structures present. The action of the tool 901 is generally to have blade 917 clear away, widen and test the insertion space into which the flanged conduit of the present invention will fit, while at the same time the lower surface of the wall 915 insures that the flanged conduit of the invention is placed to a constant, even depth.

As can be seen in FIG. 87, the vertical distance of the blade 917 is generally constant in length from the wall 915. Referring to FIG. 88, a lower surface 921 is an engagement surface for engaging shaped conductor structure 393 and which complements irregularly shaped conductor structure 381 as well as irregularly shaped conductor structure 393. It is understood that surface 921 can match any of the conductor structures previously shown, or in simple cases, the lower surface may be only flat and meet the blade 917 at an angle sufficient to urge any conduit into place. Other shapes may be curved, angled and the like, the only requirement is that the shape of surface 921 help the placement of the conduit of the invention to some extent.

Referring to FIG. 88, it can be seen the wall 909 has a top surface 923, and that the upper and lower planar surfaces 903 and 905 are part of a planar continuous wall 925. As can be seen, the blade 917 is continuous with the planar continuous wall 925. In some cases, the blade 917 can be thinned to a smaller thickness where necessary to accommodate structures of the conduits of the invention described herein. Any thinning of the blade 917 will also depend upon the material of construction. Preferably the tool 901 is made of inexpensive plastic or like material. In addition the outer surface of the continuous wall 925 is perfect to facilitate advertising, especially by installers and makers of the conduit. The surface 921 is seen to be bow shaped or double curved.

The tool 901 of FIG. 87 is ideally suited for the right hand with the curved portion of the wall 915 used to slide along the conduit of the invention back and forth to work the conduit into its support crack or thin opening. The curved lower portion of the wall 915 accommodates the rotation of the human arm, enabling the wrist to not have to be bent or laterally twisted from side to side where the installer moves an arm along a linear path. The straight portion of the tool 901 can provide the finishing force necessary to smooth out any small non linearities in the position of the conduit and to give a linear finish.

Referring to FIG. 89, a left handed version of the tool 901 is shown as tool 931. The structures are identical to the structures shown in FIGS. 87 and 88, with only the orientation reversed. The transition from the wall 915 to the wall 911 can be seen in both FIGS. 88 and 89.

Figure 90:
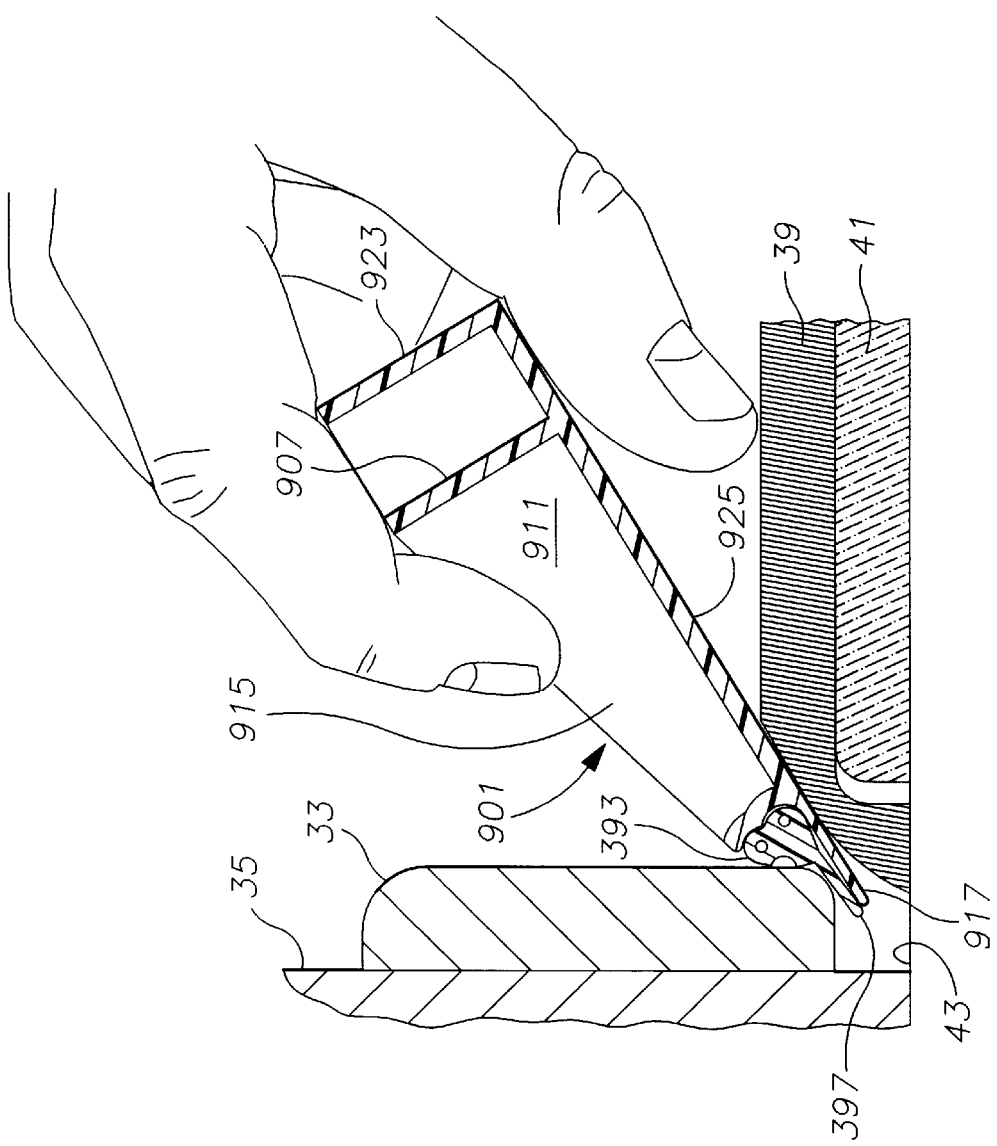
FIG. 90 is a partial sectional view taken with respect to line 90—90 on the tool and also in section on a wall in which the conduit is installed.

FIG. 90 is a partial sectional view taken with respect to line 88—88 on the tool 901 and also in section on wall 35, having base board 33, floor 43, carpet 39 and pad 41. The irregularly shaped conductor structure 393 is used as an example of a conductor structure 393 which can be used with the tool 901, and also to show the extent of customization possible since the bow or double curve shape of the surface 921 is a significant deviation from a flat surface which could be used in place of surface 921.

The conductor structure 393 is shown as resting within its custom space formed by surface 921. The flange portion 397 is seen positioned along and immediately adjacent to the blade 917. As the tool is moved forward, the conductor structure 393 engaged by the forward curvature of the wall 915 at the same time the blade 917 makes an opening between the carpet 39 and the bottom of the base board 33. This enables the conductor structure 393 to move into place, sliding against the blade 917.

Figure 91:
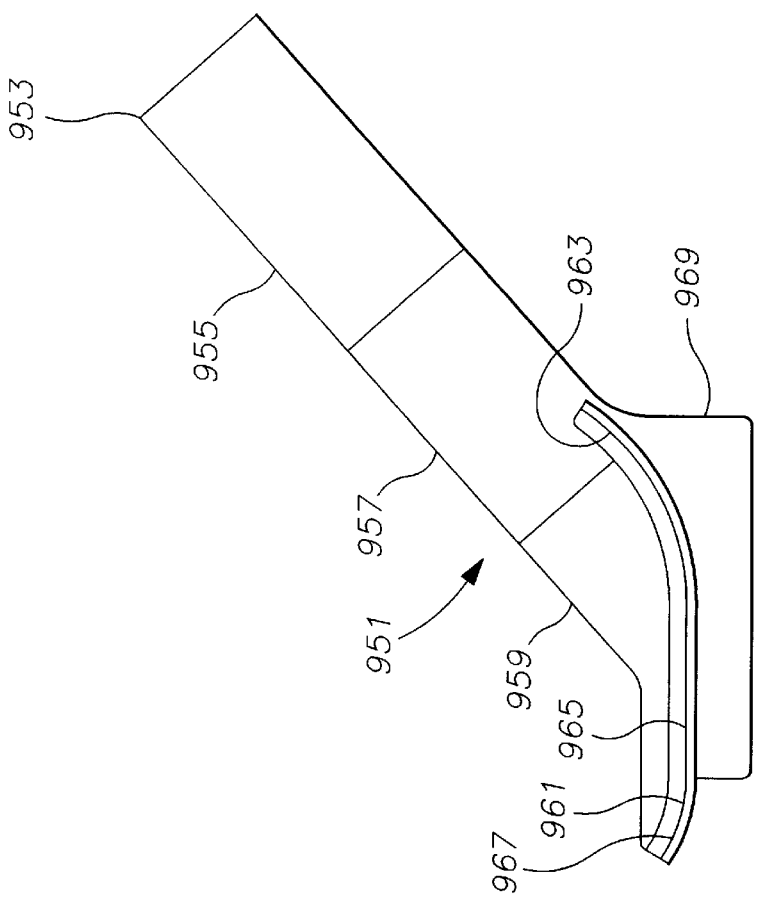
FIG. 91 is a side view of a tubular shaped tool which can be used by grasping the handle portion or fitted with an extension for working conduit into hard to reach areas.

FIG. 91 is a side view of a tubular shaped tool 951 which can be used by grasping a handle portion 953 which can be fitted with an extension (not shown) for working conductor structure 393 into hard to reach areas. The handle portion 953 includes a generally cylindrical portion 955 which may be slightly frustoconical to enable interfitting with a pole or extension (not shown). Adjacent the generally cylindrical portion 955 is an unbalanced conical transition portion 957 which transitions to a generally thin width blade support portion 959. The blade support portion 959 supports a curved wall 961 having a more elongate curved length 963 adjacent the conical transition portion 957, a generally linear portion 965, and a generally abbreviated curved length 967. The main extent of the tool 951 is shown as flat as linear portion 965, but need not be. Linear portion 965 can range from linear to gently curved, to sharply curved. Both extremes are shown, the linear configuration for tool 951, and the more sharply curving profile seen in tool 901. With tool 951, especially if an extension is used, there is not expected to be as much rotation, and more pushing and pulling is expected to occur. A blade 969 extends down from the blade support 959.

Figure 92:
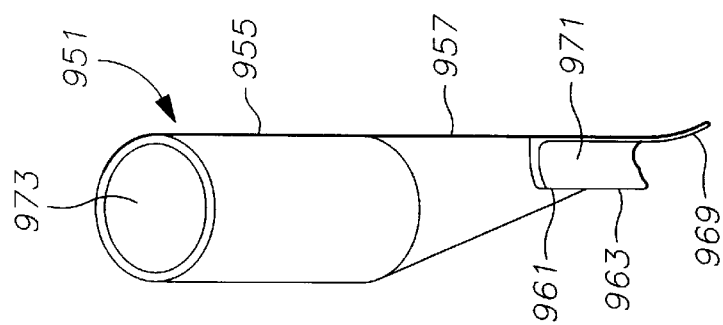
FIG. 92 is an end view with respect to FIG. 92 and looking at the tool from the handle end.

Referring to FIG. 92 an end view with respect to FIG. 91 and looking at the tool 951 from the handle 953 end shows both the eccentric conical transition portion 957, as well as a surface 971 on the curved wall 961. The surface 971 is a generalized smooth surface and is expected to work well with any of the conduit shapes described herein. Also seen is an opening 973 in the end of the generally cylindrical portion 955. Further, the blade 969 is seen to be curved slightly at its lower extent. A curved blade may be used for either tool 901 or tool 951, the curved blade 969 on tool 951 illustrated to show the possibilities. In general a curved blade may be more desirable where the working angle of the space into which conduit is being placed permits or is facilitated by the curved blade 969.

Figure 93:
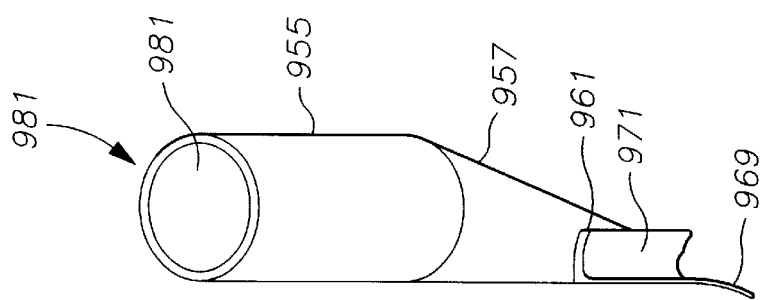
FIG. 93 is an end view of a left handed or opposite oriented tool looking from the handle end.

Referring to FIG. 93, a left handed tool 981 is shown and which is the mirror image of tool 951. All of the structures of tool 981 which correspond to tool 951 are labeled the same.

Figure 94:
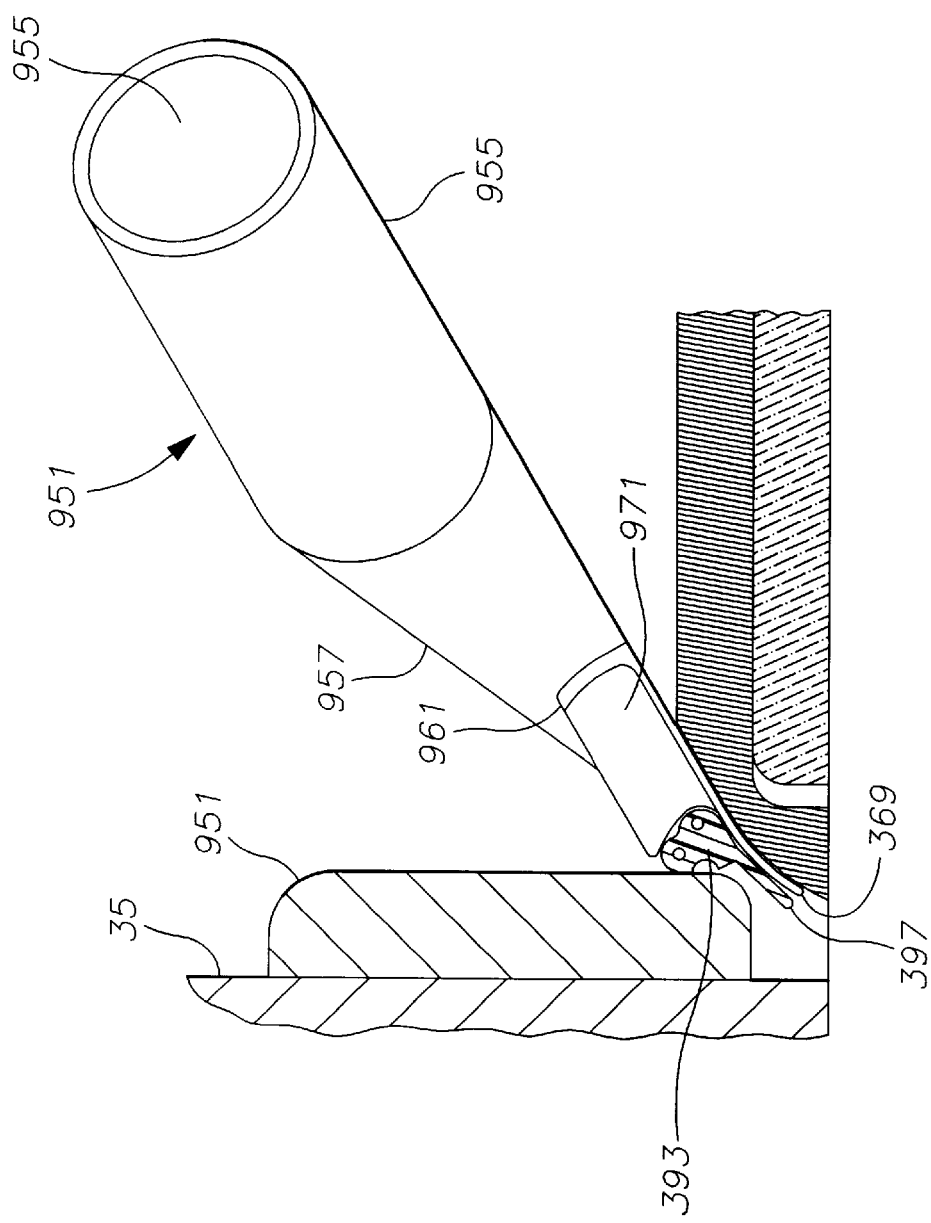
FIG. 94 is an end view of the tool of FIGS. 91–93 and shown with respect to a section of wall, base board, carpet and padding as the conduit is installed.

Referring to FIG. 94, an end view of the tool of FIGS. 91–93 and shown is a partial sectional view taken with respect to wall 35, having base board 33, floor 43, carpet 39 and pad 41. The irregularly shaped conductor structure 393 is again used as an example of a conductor structure 393 which can be used with the tool 951, and also to show a lesser extent of customization possible since the surface 971 is not formed to exactly interfit with the conductor structure 393, and also to show the effect produced by the curvature of the blade 969. The tool operates by pulling it along, as the blade 969 penetrates the available crack or space makes an opening, and enables the conductor structure 393 to move into place, sliding against the blade 969 and urged into place by the surface 971.

Figure 95:
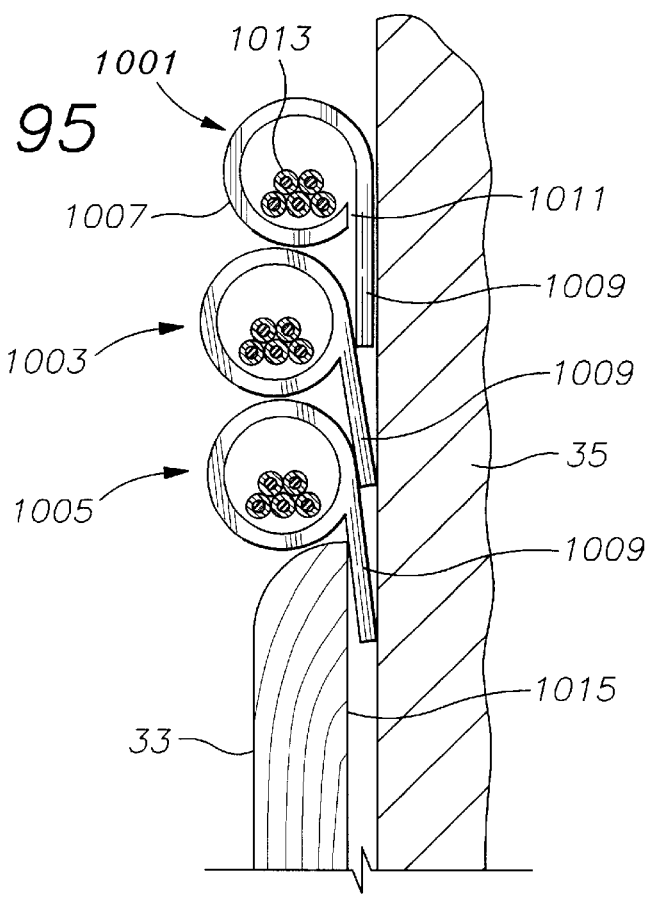
FIG. 95 is an end view illustrating one possible method of arrangement of a conduit behind a base board or molding and against a wall, for example, and in which subsequent ones of other conduit are implaced behind conduit located below, and also against the same wall to indicate stacking.

FIG. 95 is an end view illustrating one possible method of arrangement of a series of three stacked conductor structures 1001, 1003, & 1005 arranged behind base board or molding or base molding 33 and against wall 35, previously seen. Conductor structure 1001 has a conduit portion 1007 and a flange portion 1009. Conductor structure 1001 includes a slot 1011 through which smaller insulated conductors 1013 may be loaded into it, where it is provided without conductors.

Figure 96:
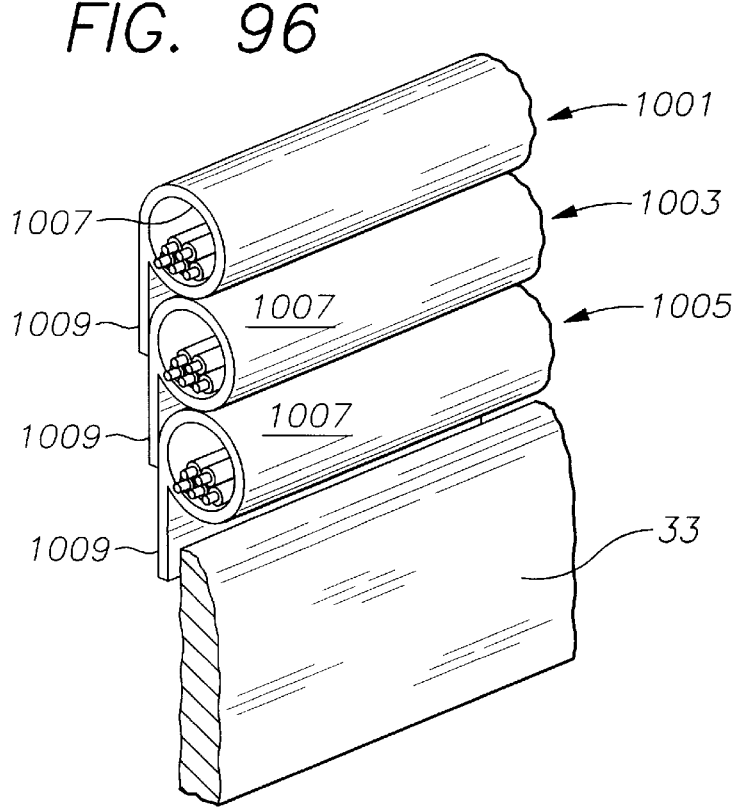
FIG. 96 is a perspective view of the stacking arrangement seen in FIG. 95 to illustrate the finished look and emphasizes that the flange portions of the conduit are hidden from view.

A space 1015 between the base molding 33 and wall 35 is exaggerated and need not be the width of three flanges 1009 in order to accommodate three stacked conductor structures 1001, 1003, and 1005. Conduit structures 1003 and 1005 are shown without the slot 1011, but any of the conduit structures 1001, 1003 or 1005 may have their insulated conductors 1013 provided with the conduit structures, or inserted from the ends, or through a slot 1011 if provided. Referring to FIG. 96, a perspective view of the stacking arrangement of the conduit structures 1001, 1003 or 1005 seen in FIG. 95 illustrates the finished look and emphasizes that the flange portions of the conduit are hidden from view.

FIG. 97 illustrates a sectional end view of a series of three, for example, stacked conduit structures 1021, 1023 and 1025 having flange portions 1027 and having solid filled conduit portions 1031, 1033 and 1035 which are somewhat heightened with respect to the more shortened flange portions 1027 to provide more space behind each conduit portions 1031, 1033 and 1035 for stacking, with the shortened flange portions 1027 to avoid overly penetrating the resulting stack.

FIG. 98 illustrates a series of conduit structures 1041, 1043, and 1045 each having a conduit portion 1047 having an upper tip 1049 for blending into wall 35. At a lower end of conduit portion 1047 of each of the conduit structures 1041, 1043, and 1045 a clip member 1051 is provided to drape over either the upper tip 1049 of an adjacent conduit structure, or an upper portion of a base molding 33. The apex of the clip member 1051 and a flange 1053 form somewhat of an accommodating structure for interfitting with either the upper tip 1049 of an adjacent conduit structure, or an upper portion of a base molding 33. The gap 1055 is shown in an exaggerated width in order to show an idealized interfitting of the conduit structures 1041, 1043, and 1045. As can be seen, for a shorter width gap 1055, the tendency of a flange 1053 to push a conduit portion 1047 will be somewhat counteracted by the guiding influence of the apex of the clip member 1051 and a flange 1053 to capture the upper tip 1049 and stabilize it. This system enables a single conduit structure to overlie an upper edge of a base board 33, lie flat against the wall 35, and to provide a sharper wall 35 and upper tip closure 1049. Addition of additional conduit structures, such as adding conduit structure 1043 onto conduit structure 1045, tends to pull the tip 1049 away only enough to insert the flange 1053, but again replacing the tip 1048 of conduit structure 1043 to form a close fit against the wall 35. In this manner, each additional conduit structures 1041, 1043, and 1045 added continues to provide a close wall 35 seal. Conduit structure 1041 is seen as having a slot 1057 for loading insulated conductors 1059, while conduit structures 1043, and 1045 have insulated conductors 1059 in solid.

Figure 99:
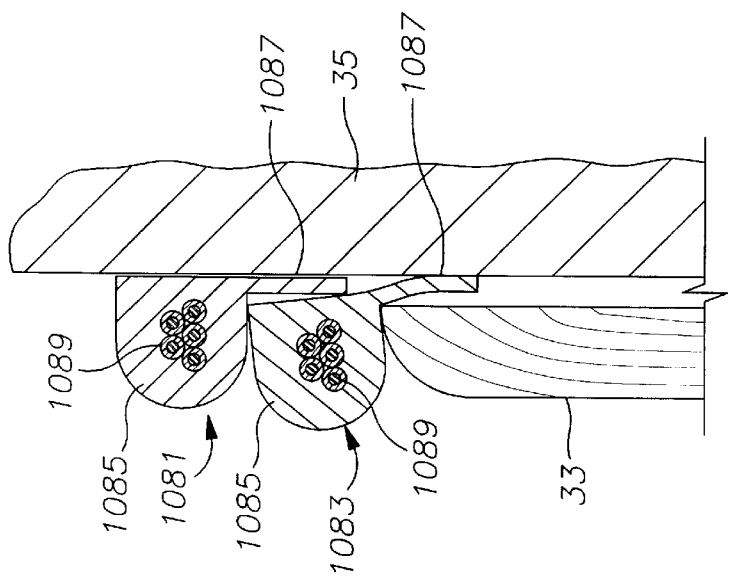
FIG. 99 illustrates a conduit structure having a shape which accommodates an upper shape of a molding and provides continuity at its upper portion between the innermost vertical portion of the molding and curving upwardly to meet the wall.
Figure 100:
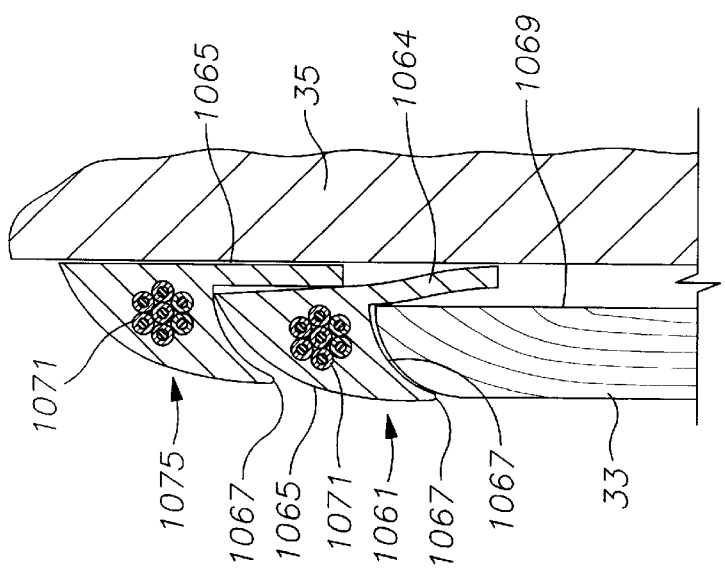
FIG. 100 illustrates two of the conduit structures of FIG. 99 but shown in stacked relationship.

Referring to FIG. 99, a conduit structure 1061 is seen having a conduit portion 1063 having a curving transition from a back surface 1065 to a lower acute tip 1067. A flange 1069 helps define one end of an inward curved surface 1071 which extends from the flange 1069 to the lower acute tip 1067. The surface 1071 is somewhat radial, but in general matches the upper surface of base molding 33. The better the match, the less conspicuous is the presence of the conduit structure 1061. A bundle of insulated conductors 1071 are shown. Referring to FIG. 100, a pair of conduit structures, including conduit structure 1061 and conduit structure 1075 are shown in stacked relation.

Figure 101:
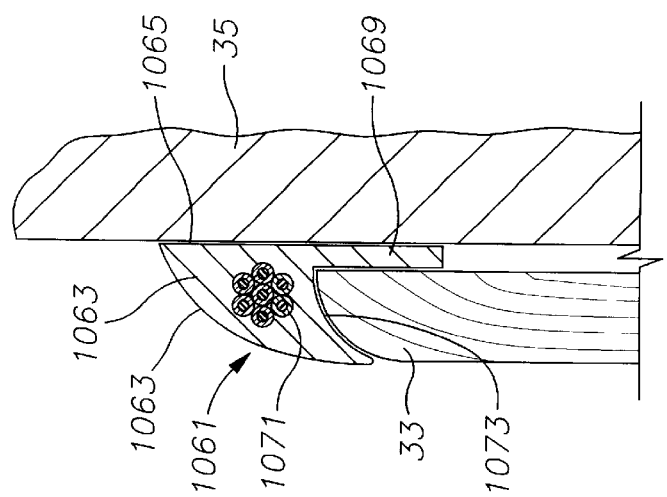
FIG. 101 illustrates a laterally wide conduit shape which extends out to or across a line tangent to the inside of molding.

FIG. 101 illustrates a laterally wide conduit member 1081 atop a second laterally wide conduit member 1083. Each of the conduit members 1081 and 1083 have a conduit portion 1085 and a flange portion 1087. The width of the conduit portion 1085 of the conduit members 1081 and 1083 need not be identical, and if the flange width is significant conduit portion 1085, different sizes of the conduit members 1081 and 1083 may be necessary to produce a uniformly flat double curved pattern. Note that the conduit members 1081 and 1083 each have a conduit portion 1085 which extends out to or across a line generally tangent to the inside general vertical extent of the base molding 33. Note that conduit member 1083 protrudes slightly across the vertical extent of the base molding 33 while conduit member 1081 protrudes to a lesser extent. Again, for thin flanges 1087 there may be less absolute relative position differences and slightly more angular displacement. Insulated conductors 1089 are seen in solid fill, but the conduit members 1081 and 1083 could also exist with a hollow chamber for supporting the conductors 1089.

Figure 102:
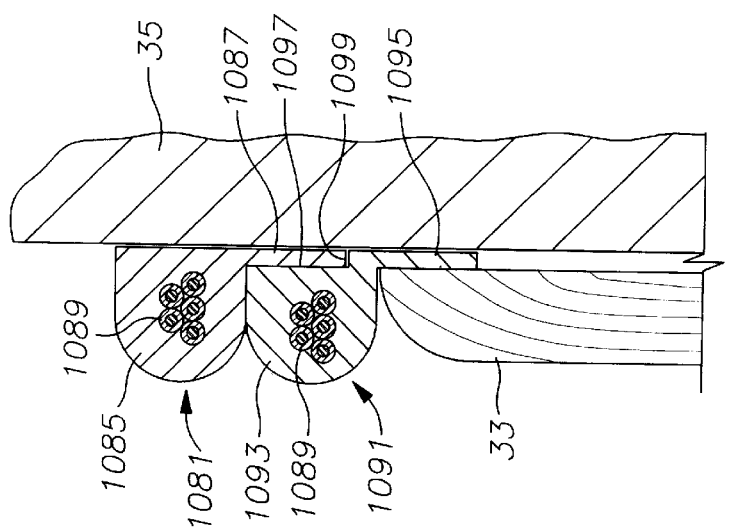
FIG. 102 illustrates the use of a lower conduit having an accommodation offset for forming a slot with respect to an adjacent structure for accommodating a flange of an upper conduit.

FIG. 102 illustrates the use of an upper conduit member 1081 as was seen in FIG. 101, but with lower conduit member 1091 having a conduit portion 1093 having a material fill about insulated conductors 1089, but having a flange 1095 which is off set from a rear surface 1097 of the conduit portion 1093 by a slight step 1099 of sufficient width to at least partially accommodate the width of the flange member 1087 above it. By use of the term "partially accommodate" it is meant that the width of the slight step 1099, which need not be at right angles to the extent of surface 1097, need not be of any degree close to a magnitude of the width of the flange member 1087. The degree of offset between the back side of flange 1095 and rear surface 1097 may only be one or two percent of the width of the flange member 1087 to be accommodated. Depending upon the choice of materials, the flange members 1087 or 1095 need not even be linear, but may be wedge shaped, in either direction either toward or away from the distal tip, and the rear surface 1097 may be similarly angled.

Figure 103:
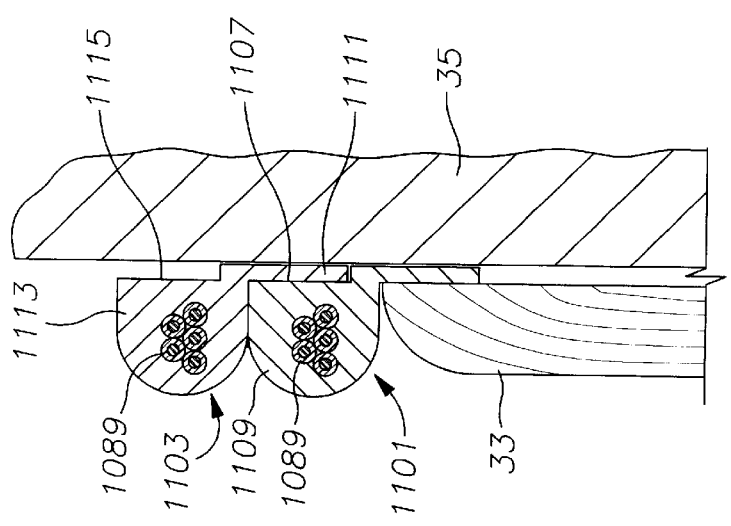
FIG. 103 illustrates the use of both a lower and an upper conduit having the accommodation offset for forming a slot with respect to an adjacent structure for accommodating a flange of an upper conduit, as seen in FIG. 102.

Referring to FIG. 103, the use of both a lower and an upper conduit member 1101 and 1103 as a solid fill supporting conductors 1105 is shown. However, lower and an upper conduit member 1101 and 1103 have rear surfaces which are angled, for example. Lower conduit member has a rear surface 1107 of its conduit portion 1109 angled to lock in a flange member 1111 of upper conduit member 1103 which flares out, or becomes wider toward its end. Conversely, upper conduit member 1103 has a conduit portion 1113 having a rear surface 1115 angled to form a frustrated wedge between rear surface 1115 and the surface of the wall 35 it faces. As is seen, any combination can be used, and depending upon the materials chosen, the ends of the flange may compress more readily than the main portion of their length. The flanges in general can be shaped for locking or for wedging.

Figure 104:
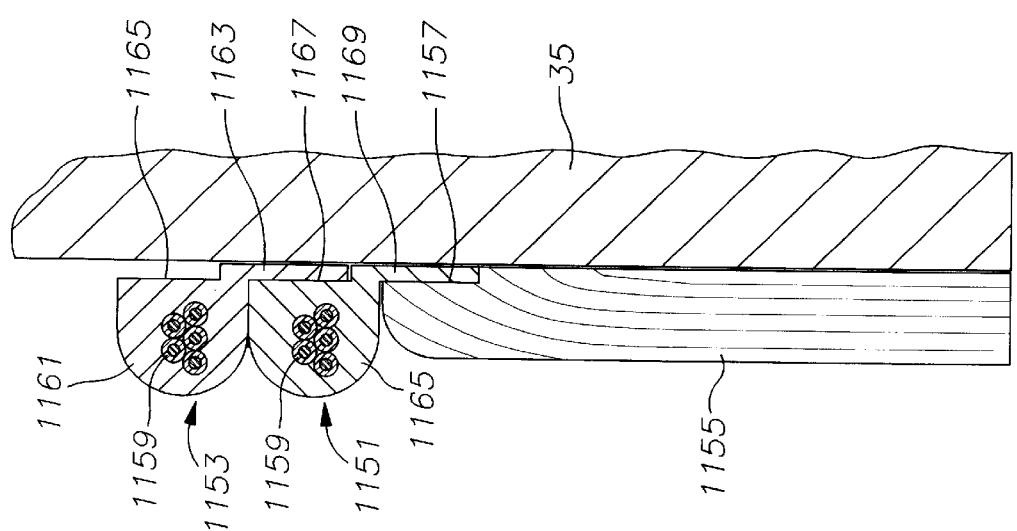
FIG. 104 illustrates the use of both a lower and an upper conduit having the accommodation offset for forming a slot with respect to an adjacent structure, but in addition to a base board or molding having an accommodation offset for forming a slot with respect to an adjacent structure, such as a wall or other structure for accommodating a flange of a conduit installed most adjacent to such molding or base board.

FIG. 104 illustrates the use of both a lower conduit structure 1151 and an upper conduit structure 1153 which are inserted using a specialized base board 1155 having an upper offset 1157. The upper conduit structure 1153 includes a solid fill body supporting insulated conduits 1159 within a conduit portion 1161, and having a flange portion 1163. Upper conduit structure 1153 conduit portion 1161 contains an offset 1165 for interfitting with an further stacked conduit structure. Lower conduit structure 1151 includes a conduit portion 1165 containing an offset 1167 for accommodating the flange 1163 of conduit portion 1161. A flange portion 1169 of lower conduit structure 1165 fits within upper offset 1157 of specialized base board 1155. In the system of FIG. 104, each laying down of a conduit structure, such as conduit structure 1151 fills an offset, such as 1157 below and provides a further offset such as 1167 above for implacement of a further conduit structure. In addition, staples, nails, or glue may engage the flange portions 1163 or 1169. The conduit structures 1151 and 1153 may be installed before the installation of base board 1155 or after. The offset 1157 may be formed on base board 1155 at the factory, or a router may used to form such an offset or slot structure on already existing structures. A flat rotating blade with a depth limiting surface could implace a slot equivalent to the space resulting from offset 1157. Removal of a conduit structure would only yield a narrow slot. In addition, the resulting slot from removal of the conduit structure could be partially filled with a clear silicone sealant to both return the upper surface of the base board 1155 to a state where the slot cannot be seen, as well as to leave the base board 1155 amenable to removal of the sealant should the user wish to re-employ the conduit structure. A simple tool could rapidly remove the material in a short time.

While the present invention has been described in terms of a conduit structure as well as structures for both anchoring, supporting, securing, and installing electrical conductors, as well as tools for installing conduit supporting the electrical conductors, one skilled in the art will realize that the structure and techniques of the present invention can be applied to many similar devices. The present invention may be applied in any situation where electrical conductor support is needed.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A flanged conduit for installation adjacent a structure and comprising:
   a conduit portion for supporting conductors having an elongate body having an outside surface and an inside surface spaced from said outside surface and defining an internal cavity, and having a first side for facing against said structure; and
   a flange portion support structure extending from said conduit portion and having a first side for facing against said structure, and a second side opposite said first side, said conduit portion having an offset taken with respect to at least one of a part of said first side of said conduit portion and said first side of said flange portion support structure, said offset for forming an accommodation for stacking of adjacent ones of said flanged conduit.

2. The flanged conduit of claim 1 wherein said flange portion support structure includes an anchoring structure portion extending from said flange portion support structure and having at least one surface having an anchoring structure surface extending from said first side of said flange portion support structure, for engaging a surface irregularity of said structure.

3. The flanged conduit of claim 2 wherein said flange portion support structure is curved.

4. The flanged conduit of claim 1 wherein said offset terminates above a minimum extent of said conduit portion.

5. The flanged conduit of claim 1 wherein said flange portion support structure extends away from said conduit intermittently along a length of said conduit.

6. The flanged conduit of claim 1 wherein said conduit portion has a round cross sectional shape.

7. The flanged conduit of claim 1 wherein said conduit portion has a triangular arc shaped cross sectional shape.

8. The flanged conduit of claim 1 wherein said flange portion support structure is separated from said conduit portion via a reduced area portion with respect to a cross sectional profile.

9. The flanged conduit of claim 8 wherein said reduced area portion is formed by at least one notch formed in at least one of said first and second sides of said flange portion support structure, said notch having a notch shape with respect to said cross sectional profile, said reduced area portion to facilitate the selective tearing away of said flange portion support structure along selected lengths of said flanged conduit.

10. The flanged conduit of claim 1 wherein said cavity of said conduit portion has at least one lateral opening to enable side loading of conductors into said cavity.

11. The flanged conduit of claim 1 wherein said structure is at least one of a wall, a molding, a floor, a carpet, a rug, a baseboard and another flanged conduit.

12. The flanged conduit of claim 1 wherein said structure is at least one of a molding and a baseboard and having an offset to accommodate said flange portion.

13. A flanged conduit for installation between any two structures comprising:
   a conduit portion having an elongate body having an outside surface and carrying at least one conductor and having a first side for facing against one of said any two structures; and
   a flange portion support structure which extends away from said conduit portion and having a first side for facing against said one of said any two structures, and a second side opposite said first side, said conduit portion including an offset taken with respect to at least one of a portion of said first side of said conduit portion and said first side of said flange portion support structure, said offset for forming an accommodation for stacking of adjacent ones of said flanged conduit.

14. The flanged conduit of claim 12 wherein said offset terminates above a minimum extent of said conduit portion.

15. The flanged conduit of claim 13 wherein said structure is at least one of a wall, a molding, a floor, a carpet, a rug, a baseboard and another flanged conduit.

* * * * *